(12) United States Patent
Yada

(10) Patent No.: US 6,343,157 B1
(45) Date of Patent: Jan. 29, 2002

(54) IMAGE CODING SYSTEM, IMAGE DECODING SYSTEM, IMAGE PROCESSING SYSTEM, IMAGE CODING METHOD, IMAGE DECODING METHOD, AND IMAGE PROCESSING METHOD

(75) Inventor: Shinichi Yada, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/253,518

(22) Filed: Feb. 19, 1999

(30) Foreign Application Priority Data

Mar. 5, 1998 (JP) ............................. 10-053007

(51) Int. Cl.[7] .......................... G06K 9/36; H04N 1/419
(52) U.S. Cl. .................... 382/246; 382/244; 358/261.1; 358/427
(58) Field of Search ................. 358/427, 426, 358/261.1; 382/244, 246

(56) References Cited

U.S. PATENT DOCUMENTS 5,006,929 A * 4/1991 Barbero ...................... 358/105
6,075,470 A * 6/2000 Little et al. .................. 341/107
6,219,147 B1 * 4/2001 Ichimura ..................... 358/1.13

FOREIGN PATENT DOCUMENTS

| JP | 403261255 A | * 11/1991 | ........... H04L/29/08 |
| JP | A-6-326875 | 11/1994 | ........... H04N/1/413 |

* cited by examiner

Primary Examiner—Jerome Grant, II
(74) Attorney, Agent, or Firm—Oliff & Berridge, PLC.

(57) ABSTRACT

A raster/block conversion circuit 12 divides an input image from an image input unit 11 into blocks. An image characteristic determination circuit 13 calculates the image characteristic for each block, thereby determining the image type for each block. Based on the determination result of the image characteristic determination circuit 13, a switch circuit 18 adaptively switches an ADCT coding circuit 14 adopting a variable-length irreversible coding technique and an intrablock quad coding circuit 15, an intrablock binary coding circuit 16, and a block run length coding circuit 17 adopting a fixed-length irreversible coding technique.

23 Claims, 21 Drawing Sheets

Fig. 3A

| 159 | 153 | 158 | 152 | 140 | 138 | 132 | 132 |
|---|---|---|---|---|---|---|---|
| 164 | 162 | 162 | 157 | 151 | 142 | 134 | 132 |
| 167 | 168 | 161 | 160 | 160 | 150 | 140 | 132 |
| 200 | 210 | 210 | 210 | 110 | 100 | 90 | 91 |
| 220 | 210 | 200 | 90 | 80 | 72 | 71 | 59 |
| 200 | 191 | 180 | 142 | 100 | 99 | 69 | 55 |
| 200 | 100 | 100 | 100 | 100 | 100 | 99 | 90 |
| 30 | 35 | 35 | 25 | 25 | 22 | 23 | 34 |

Fig. 3B

| 260 | 49 | −16 | 5 | 2 | 4 | 0 | 1 |
|---|---|---|---|---|---|---|---|
| −79 | 36 | −2 | −7 | 1 | −3 | −1 | −2 |
| 0 | −8 | 3 | −2 | 2 | 1 | 5 | 1 |
| 8 | −4 | −5 | 4 | 1 | 7 | 1 | 6 |
| −2 | −6 | 1 | 0 | 4 | 2 | −1 | −10 |
| −3 | −2 | −1 | 1 | 0 | 0 | 1 | 0 |
| 4 | 3 | 2 | 0 | 0 | −2 | 2 | 0 |
| 1 | −1 | 1 | 2 | −2 | 0 | 0 | 0 |

Fig. 3C

| 16 | 4 | −2 | 0 | 0 | 0 | 0 | 0 |
|---|---|---|---|---|---|---|---|
| −7 | 3 | 0 | 0 | 0 | 0 | 0 | 0 |
| 0 | −1 | 0 | 0 | 0 | 0 | 0 | 0 |
| −1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Fig. 3D

| 16 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

BINARIZED IMAGE IN PHOTO HALFTONE DOT AREA

BINARIZED IMAGE IN TEXT EDGE AREA

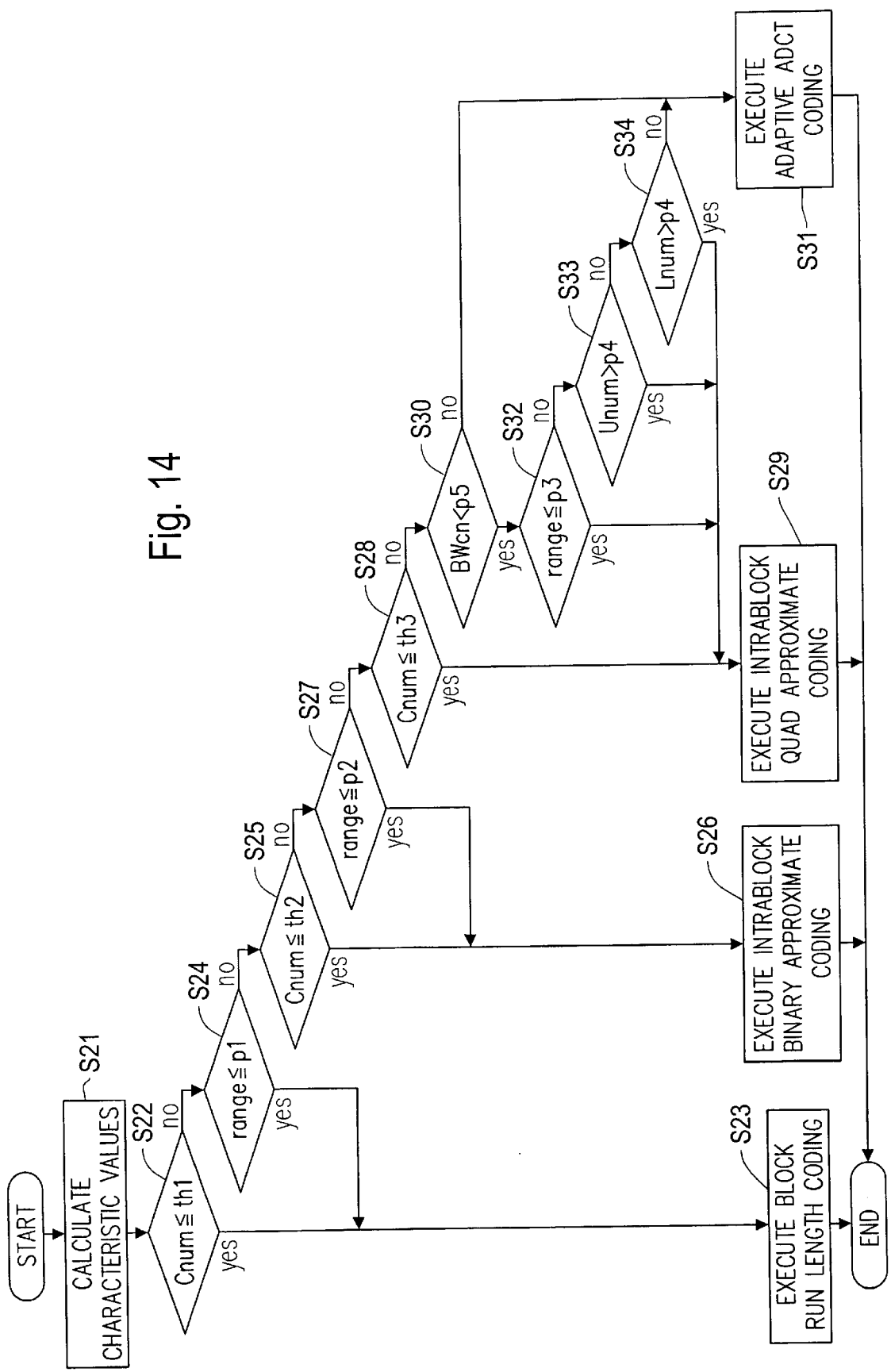

Fig. 17A

| 4  | 6  | 10 | 10 | 12 | 15 | 18 | 20 |
|----|----|----|----|----|----|----|----|
| 6  | 7  | 11 | 25 | 15 | 20 | 23 | 25 |
| 10 | 10 | 11 | 15 | 21 | 23 | 30 | 30 |
| 12 | 15 | 15 | 22 | 23 | 30 | 44 | 40 |
| 12 | 15 | 20 | 23 | 30 | 41 | 50 | 50 |
| 15 | 30 | 23 | 30 | 40 | 50 | 55 | 60 |
| 18 | 23 | 30 | 40 | 55 | 50 | 55 | 70 |
| 20 | 25 | 30 | 40 | 50 | 60 | 71 | 60 |

Fig. 17B

| 20 | 15 | 18 | 20 | 34 | 35  | 39  | 40  |
|----|----|----|----|----|-----|-----|-----|
| 15 | 17 | 21 | 35 | 36 | 41  | 40  | 52  |
| 18 | 21 | 34 | 36 | 40 | 42  | 52  | 66  |
| 21 | 32 | 35 | 51 | 44 | 55  | 70  | 83  |
| 35 | 34 | 42 | 47 | 60 | 70  | 97  | 92  |
| 35 | 40 | 45 | 60 | 69 | 101 | 115 | 118 |
| 40 | 44 | 55 | 73 | 97 | 110 | 104 | 110 |
| 41 | 59 | 69 | 83 | 92 | 118 | 110 | 120 |

Fig. 17C

| 30  | 44  | 49  | 51  | 77  | 81  | 90  | 100 |
|-----|-----|-----|-----|-----|-----|-----|-----|
| 42  | 48  | 55  | 75  | 80  | 91  | 103 | 133 |
| 53  | 60  | 71  | 79  | 90  | 106 | 130 | 147 |
| 62  | 69  | 82  | 92  | 111 | 133 | 151 | 170 |
| 70  | 80  | 90  | 110 | 134 | 155 | 170 | 200 |
| 82  | 90  | 108 | 129 | 151 | 180 | 200 | 255 |
| 91  | 106 | 130 | 147 | 178 | 210 | 255 | 255 |
| 110 | 130 | 150 | 170 | 200 | 255 | 255 | 255 |

IMAGE CODING SYSTEM, IMAGE DECODING SYSTEM, IMAGE PROCESSING SYSTEM, IMAGE CODING METHOD, IMAGE DECODING METHOD, AND IMAGE PROCESSING METHOD

BACKGROUND OF THE INVENTION

This invention relates to an image coding system, an image decoding system, an image processing system, an image coding method, an image decoding method, and an image processing method.

In recent years, a digital copier for reading an original image through an image input unit such as a scanner, digitally processing image data output from the image input unit, and outputting the resultant data from an image output unit such as a printer, thereby providing a hard copy of the original has been finding spreading use. The digital copier must always have an electronic RDH function and an electronic sorter function of storing a number of pieces of image data in the copier and executing original sorting, filing, and page editing. To provide the functions, a data storage unit such as memory or hard disk is installed in the copier and image data is stored in the data storage unit and is output as required.

By the way, to store a large amount of image data, the storage capacity of the data storage unit need to be increased, but the scale and costs of the data storage unit also grow with an increase in the storage capacity. To avoid this problem, various methods of coding and storing image data are proposed. The coding methods enable a large amount of image data to be stored in a data storage unit of a small storage capacity.

A laser beam printer using a laser beam is available as an image output unit. Generally, a page description language is used for a control method of image output to a laser beam printer. That is, a host computer to which a laser beam printer is connected does not transfer the output contents to the printer as a bit map image (raster image) and transfers the contents of the page description language describing the text information and image information of the output contents to the printer.

On the other hand, the printer receives the page description language, interprets the language contents, expands page image data as a bit map image (raster image), and transfers the image onto paper, then outputs. To realize this capability, the printer must have a function of interpreting the contents of the page description language and memory for retaining a bit map image into which image data is expanded.

Assuming that image output resolution is 400 dpi and that the number of gray levels is 256 for a monochrome printer for outputting an a4-size image, for example, a 32-Mbyte capacity becomes necessary as the capacity of the memory. Further, for a color printer, four-color output of Y, M, C, and K becomes necessary and the memory capacity becomes four times (128 Mbytes). Installation of such large-capacity memory in the printer leads to an increase in the scale and costs of the printer.

Further, in recent years, the demand for high-resolution output has been made to provide an output image with high quality. To realize high-resolution image output ranging from 600 dpi to 2400 dpi, the memory capacity of a printer also increases exceptionally. For example, although a memory capacity of 128 Mbytes is required for YMCK 400 dpi, a memory capacity of 288 Mbytes is required for 600 dpi and an enormous memory capacity of 4608 Mbytes is required for 2400 dpi; it becomes impractical in both costs and circuit scale.

To avoid this problem, a method of coding and retaining image data in memory for reducing the memory capacity is possible. This method enables a large amount of image data to be retained in a small capacity.

To code image data for reducing the data capacity, it is possible to reduce the number of gray levels of reproducing an image and store the image in binary form. However, if the number of gray levels of reproducing is reduced, the quality of the finally provided image output is degraded. Thus, to store a high-quality image, it is desirable to store the image in multivalued form rather than in the binary form. A large number of methods of coding multivalued image data are available.

By the way, a text area and a photo area often are mixed in one sheet of an original output on a digital copier or a printer. Also, a computer-prepared image, namely, so-called computer graphics (CG) image and a natural image such as a photo, etc., read through a scanner often are mixed in a printer output image. The CG and natural images have entirely different image characteristics.

For example, a CG image area is constant in pixel value change and contains a flat background area with no pixel value change as a large part. Further, the CG image area also contains a text area containing only binary values of monochrome, a gradation area in which pixel values change violently, and the like. In contrast, a natural image area often contains noise when it is read through a scanner; pixel values often change finely even in an area which seems to be flat, such as an image background or blank.

Since the CG image and natural image areas have different image characteristics, optimum coding processing for each image quality characteristic needs to be performed to code the image data of mixed image with high quality and efficiently. To meet such demand, for image data with mixed areas having different image characteristics, optimum coding processing needs to be selected and performed for each area in response to the image data. A large number of such coding techniques are proposed as adaptive image coding technique, multi-mode coding technique (refer to the Unexamined Japanese Patent Application Publication No. Hei 6-326875, for example).

The CG image area often contains an image requiring a high resolution, such as a text or a line drawing, and further contains a gradation area having uniform pixel value change, an area in which pixel values having regular arrangement are continuous (for example, hatching, halftone, etc.,), and the like. Thus, generally, a coding technique not degrading the quality of a decoded image is desired for the CG image area. For example, a reversible coding technique of MMR (Modified Modified Read), LZW (Lempel-Ziv-Welch), JBIG (Joint Bi-level Image Group), etc., is applied.

Since the natural image area often contains an image requiring the gradation data rather than resolution data, such as a photo, a coding technique suppressing gradation data degradation is desired. If the reversible coding technique suppressing image degradation after decoding is applied to the natural image area, pixel values change violently and entropy is high in the natural image area, thus efficient coding cannot be accomplished in the reversible coding technique. Then, an irreversible coding technique is applied to the natural image area; an irreversible coding technique capable of retaining gradation data after decoding is appropriate. For example, ADCT (Adaptive Discrete Cosine Transform), etc., typified by JPEG (Joint Photographic Experts Group) baseline technique adopted as a color fax standard coding technique is applied.

In the multimode coding technique for selectively applying an optimum coding technique for each area of an image with mixed CG image and natural image areas, hitherto, reversible coding has been applied to the CG image area to prevent image quality degradation in the CG image area. In the reversible coding technique, the essential information amount of the image to be coded (entropy amount) is also retained after coding, the coding ratio greatly changes with the essential information amount, and the code amount after coding also greatly changes with the essential information amount. That is, a simple image results in a small code amount; a complicated image results in an enormous code amount.

Since the reversible coding technique retains the essential information, the image data before coding completely matches that after coding. If the essential information amount is very large, the coding ratio in reversible coding becomes 1/1 at the worst and the maximum code amount also becomes the same data amount as the original image. That is, there is a possibility in the reversible coding that coding will be unable to be executed and the data amount will not be decreased depending on the image to be coded.

Thus, to realize the multimode coding of applying the reversible coding to the CG image area, the code data memory capacity for retaining data requires the same capacity as the original image. In the multimode coding, if all image areas are determined CG image areas, the theoretical maximum code amount becomes the same size as the original image. Thus, the provided code data memory capacity becomes the same size as the original image.

For example, assuming that the maximum size of the image to be coded is A3 and that the image is YMCK 600 dpi, the data amount of the original image becomes 288 Mbytes, thus the code data memory capacity needs also be provided 288 Mbytes. Installation of such large-capacity memory is impractical from costs and therefore the demand for reducing the memory capacity occurs.

In the ADCT coding, an image is divided into blocks, DCT (Discrete Cosine Transform) is executed for each block, the DCT coefficients are quantized, and the quantized DCT coefficients are Huffman coded. The Huffman coding at the last stage is variable-length coding and the ADCT coding is irreversible variable-length coding. That is, as with the above-described reversible coding, the coding ratio changes in response to the image to be coded and the minimum coding ratio becomes 1/1 in the ADCT coding.

Thus, as with the reversible coding, the code data memory capacity needs to be provided as the same size as the original image, and large-capacity code memory needs to be installed.

SUMMARY OF THE INVENTION

It is therefore an object of the invention to provide an image coding system, an image decoding system, an image processing system, an image coding method, an image decoding method, and an image processing method capable of performing efficient coding if the image contains mixed areas greatly different in image characteristic, such as CG image and natural image areas, and making it possible to provide a high-quality image with minimized image quality degradation of the decompressed image if a small code data memory capacity is available.

To the end, according to the invention, there is provided an image coding system comprising block division means for dividing an input image into blocks each containing a plurality of pixels, image characteristic determination means for determining the characteristic of an image in each of the blocks provided by the block division means, variable-length coding means for performing variable-length coding for the input image, fixed-length coding means for performing fixed-length coding for the input image, and control means for selecting either of the variable-length coding means and the fixed-length coding means based on the determination result of the image characteristic determination means and controlling the selected coding means so as to execute coding for the input image.

In the described image coding system, first the block division means divides an input image into blocks each containing a plurality of pixels, for example, image blocks each consisting of eight X eight pixels. Each block image is fed into the image characteristic determination means, which then analyzes the image characteristic of the block image and determines the optimum decoding technique for decoding the block image. The control means selects the coding means adopting the optimum coding technique, the variable-length coding means or the fixed-length coding means, and controls the selected coding means so as to code the block image. Preferably, identification information indicating the coding technique used for the coding is added to the code data and the code data to which the identification information is added is output.

According to the invention, there is provided an image decoding system for decoding code data output from the image coding system, the image decoding system comprising extraction means for extracting the identification information indicating a coding technique from the code data, variable-length decoding means for performing variable-length decoding of the code data from which the identification information is extracted, fixed-length decoding means for performing fixed-length decoding of the code data from which the identification information is extracted, and control means for selecting either of the variable-length decoding means and the fixed-length decoding means based on the identification information extracted by the extraction means and controlling the selected decoding means so as to execute decoding for the code data from which the identification information is extracted.

In the described image decoding system, first the extraction means extracts the identification information specifying the coding technique used for the coding from the code data output from the image coding system. The control means selects the variable-length decoding means or the fixed-length decoding means adopting the decoding technique corresponding to the extracted identification information and controls the selected decoding means so as to execute decoding for the code data.

According to the invention, there is provided an image processing system comprising the described image coding system and the described image decoding system. In the image processing system, the image coding system divides an input image into blocks, determines the image characteristic for each block, executes coding for the input image using variable-length coding or fixed-length coding based on the determination result, adds identification information indicating the used coding type, and outputs code data to which the identification information is added, and the image decoding system extracts the identification information from the code data output from the image coding system, selects the variable-length decoding or fixed-length decoding corresponding to the extracted identification information, and decodes the code data from which the identification information is extracted.

According to the invention, there is provided an image coding method comprising the steps of dividing an input image into blocks each containing a plurality of pixels, determining the characteristic of an image in each block, and selecting either of variable-length coding and fixed-length coding based on the determination result and executing the selected coding for the input image. Preferably, the identification information indicating the used coding type of variable-length coding or fixed-length coding is added to the code data coded using either of the variable-length coding and the fixed-length coding.

According to the invention, there is provided an image decoding method comprising the steps of extracting the identification information from the code data coded by the image coding method, selecting either of the variable-length decoding and the fixed-length decoding based on the extracted identification information, and executing decoding for the code data from which the identification information is extracted.

According to the invention, there is provided an image processing method comprising the steps of dividing an input image into blocks each containing a plurality of pixels, determining the characteristic of an image in each block, selecting either of variable-length coding and fixed-length coding based on the determination result, executing the selected coding for the input image, adding identification information indicating the selected coding type of variable-length coding or fixed-length coding, outputting the code data to which the identification information is added, extracting the identification information from the code data, selecting either of the variable-length decoding and the fixed-length decoding based on the extracted identification information, and executing decoding for the code data from which the identification information is extracted.

BRIEF DESCRIPTION OF THE DRAWINGS

In the accompanying drawings:

FIG. 3 provides illustrations to show data examples according to the first embodiment of the invention; FIG. 3A shows block image data, FIG. 3B shows DCT coefficient data after DCT of FIG. 3A, FIG. 3C shows DCT coefficient data after quantization of FIG. 3B, and FIG. 3D show a quantization table in quantization of FIG. 3C;

FIG. 13A shows an image example provided by binarizing a block containing text and line drawing edges and FIG. 13B shows an image example provided by binarizing a halftone dot image such as a photo;

FIG. 14 is a flowchart of image characteristic determination according to the second embodiment of the invention;

FIGS. 17A to 17C are illustrations to show quantization table examples according to the second embodiment of the invention; FIG. 17A shows an edge quantization table example, FIG. 17B shows a halftone dot quantization table example, and FIG. 17C is a quantization table example for a high coding ratio;

DETAILED DESCRIPTION OF THE PREFERRED EMBODIMENTS

Referring now to the accompanying drawings, there are shown preferred embodiments of the invention. In the description to follow, a monochrome image of eight bits/pixel as the number of gray levels of an input image is taken as an example, but the invention is not limited to it and can also be applied to an RGB image of 24 bits/pixel or a YMCK color image of 32 bits/pixel.

Figure 1:
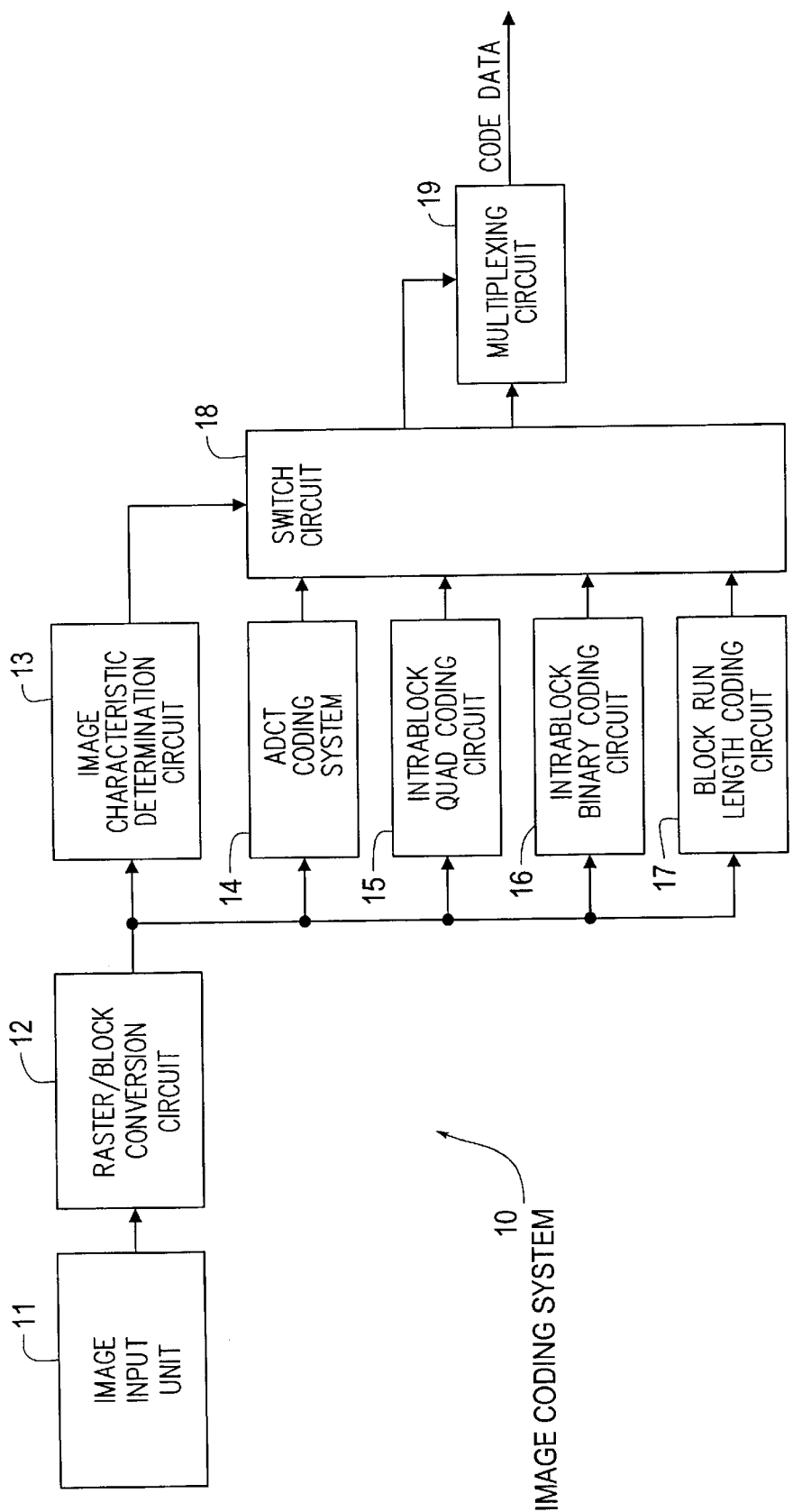
FIG. 1 is a block diagram to show a configuration example of an image coding system according to a first embodiment of the invention.

FIG. 1 is a block diagram to show a configuration example of an image coding system in an image processing system according to a first embodiment of the invention.

As seen in FIG. 1, an image coding system 10 according to the first embodiment comprises an image input unit 11, a raster/block conversion circuit 12, an image characteristic determination circuit 13, an ADCT coding circuit 14, an intrablock quad coding circuit 15, an intrablock binary coding circuit 16, a block run length coding circuit 17, a switch circuit 18, and a multiplexing circuit 19.

In the described image coding system 10, the image input unit 11, which is an interface for receiving a raster image, receives image data directly as a raster image of digital data from an external network, etc., like an external interface or raster data from a printer controller for outputting raster image prepared from PostScript. The image data input from the image input unit 11 is sent to the raster/block conversion circuit 12.

The raster/block conversion circuit 12 divides the input image data into block images each consisting of 8×8 pixels, for example, and outputs the block images. When the width of an image is not a multiple of eight, pixel data of less than 8×8 pixels occurs in an edge of the image. In this case, the raster/block conversion circuit 12 adds dummy pixels so as to form 8×8 pixels and outputs 8×8-pixel block image data. The image data of the block images is sent to the image characteristic determination circuit 13 and also to four coding circuits 14 to 17.

The image characteristic determination circuit 13 receives each block image output from the raster/block conversion circuit 12, references the pixel value distribution state in the block, and analyzes the image characteristic of the input block image. Based on the analysis result of the image characteristic, the image characteristic determination circuit 13 determines which of the coding techniques of the four coding circuits 14–17 is optimum for the input block image, and outputs the determination result as a tag signal.

Specifically, to analyze the image characteristic, the image characteristic determination circuit 13 calculates the characteristic value indicating the image characteristic for each block and determines the image characteristic from the state of the characteristic value. In the embodiment, the number of intrablock levels is used as the characteristic value. The number of intrablock levels is a numeric value indicating how many types of values exist in an 8×8-pixel block. It is one index indicating complicity of the pixel value distribution of the block image. For example, if a block contains all uniform values, such as a block in a background area of image data, the number of intrablock levels becomes one.

If a block contains two different values (namely, background color and drawing color), such as a block containing a straight line drawn in a white background, the number of intrablock levels becomes two. For a block of a photo, etc., values change complicatedly, thus the number of intrablock levels becomes a large value. This characteristic is used to analyze the image characteristic for each block. Since the block size is 8×8 pixels, the maximum value of the number of intrablock levels is 64.

The four coding circuits 14–17 receive each block image output from the raster/block conversion circuit 12 and perform coding processing for the block image separately. The coding technique used with the coding circuit 14 is one type of orthogonal transformation coding technique, generally called ADCT coding technique. The coding techniques used with the coding circuits 15–17 are intrablock quad coding technique, intrablock binary coding technique, and block run length coding technique, which are improvements of a technique generally called block truncation (BTC) coding technique.

The code data provided by performing coding processing in the four coding circuits 14–17 is sent to the switch circuit 18, which then selects one of the four received code data pieces based on a tag signal received from the image characteristic determination circuit 13, and sends the selected code data to the multiplexing circuit 19, which then combines the selected code data and the tag signal into one and outputs the data as final code data.

The four coding circuits 14–17 will be discussed. First, the ADCT coding circuit 14 will be discussed. It adopts coding technique typified by JPEG baseline technique, variable-length coding system with the output code data amount changing in response to the complicity of input image data, and irreversible coding technique that can control the quality and coding ratio of the coded image to some extent by setting a coding parameter.

Figure 2:
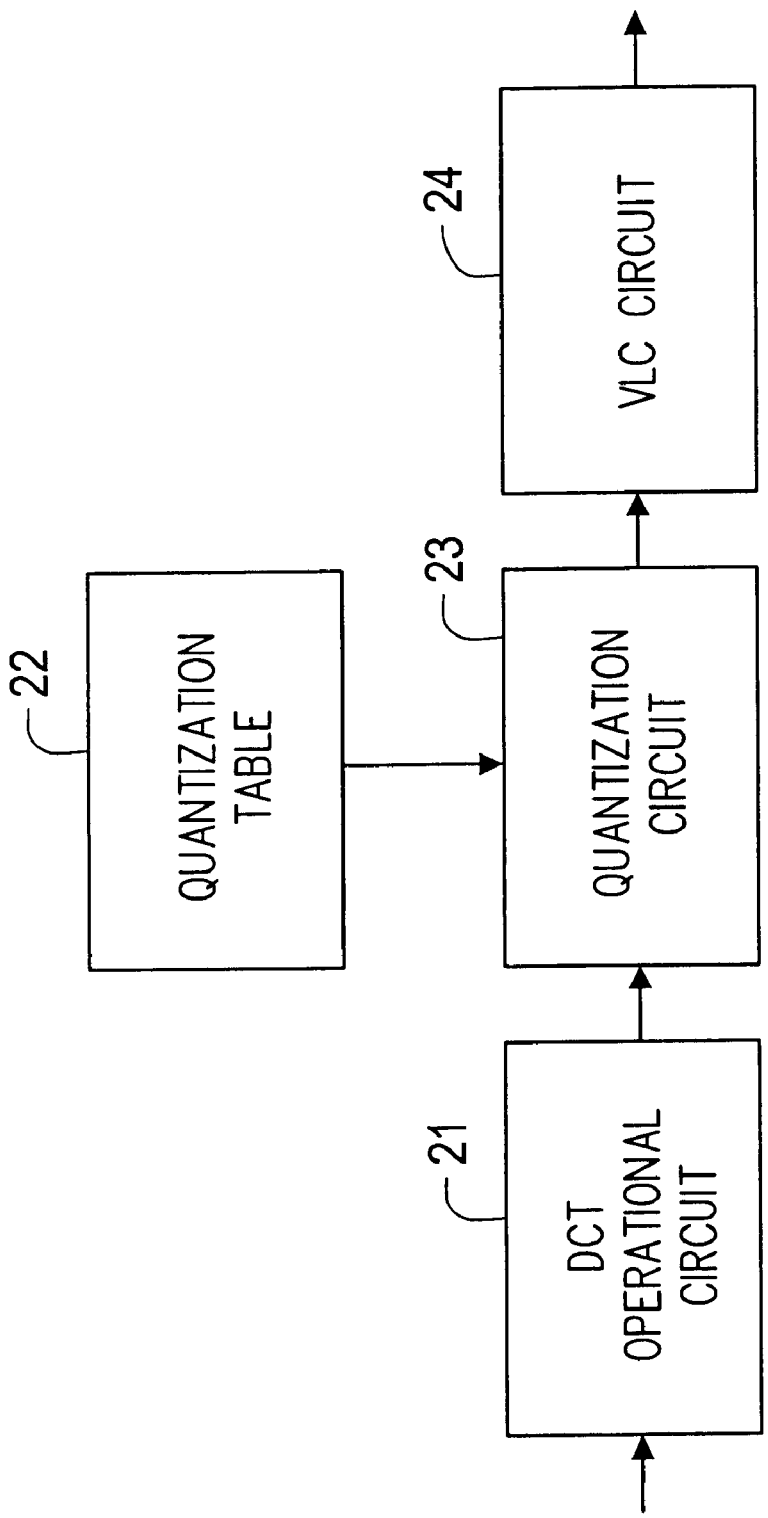
FIG. 2 is a block diagram to show a configuration example of an ADCT coding circuit according to the first embodiment of the invention.

FIG. 2 is a block diagram to show a configuration example of the ADCT coding circuit 14. To code data in the ADCT coding circuit 14, an image is divided into blocks, DCT is executed for each block in a DCT operational circuit 21, the DCT coefficients are quantized in a quantization circuit 23 using a quantization table 22, and the quantized DCT coefficients are Huffman coded in a VLC circuit.

FIG. 3A shows an example of a block image (numerals show density level of pixels), FIG. 3B shows an example of the DCT coefficients of FIG. 3A (low frequency components are shown at the upper left corner thereof, high frequency components are shown at the lower right corner thereof), FIG. 3C shows an example of the DCT coefficients after quantization of FIG. 3B, and FIG. 3D show an example of the quantization table for quantization of FIG. 3B.

Next, the intrablock quad coding circuit 15 will be discussed. It adopts a coding technique for representing the whole block in four different values, an improvement of the block truncation coding technique. If the number of intrablock levels of a block is four or less, the four values become representative values of the block. That is, if the number of intrablock levels is four or less, the decoded image in the block coded in the four values in the block completely matches the original image and the same effect as reversible coding is produced. If the number of intrablock levels is five or more, the first four different values encountered are coded as representative values of the block.

The code data of the intrablock quad coding circuit 15 consists of four representative values of the block and pixel flags each indicating which of the four representative values the corresponding pixel is to be assigned to. Each of the four representative values is represented by eight bits. Each of the pixel flags consists of two bits to indicate which of the four representative values the corresponding pixel is to be assigned to. For an 8×8-pixel block, the data amount of the pixel flags becomes $$8 \times 8 \times 2 \text{ bits} = 128 \text{ bits}$$

The total data amount of the four representative values becomes $$8 \times 4 = 32 \text{ bits}$$

Therefore, the code data amount of the intrablock quad coding circuit 15 becomes $$128 + 32 = 160 \text{ bits}$$

Thus, the coding ratio becomes $$160/(8 \times 8 \times 8) = 1/3.2$$

According to this, it is possible provide with a printing system or a copy system of which storing capacity of memories for storing data of one page is reduced to be less than one third of that in a conventional art.

The intrablock quad coding circuit 15 is applied to block images, each containing a large number of pixel values, requiring image quality of a comparatively high resolution, for example, block images containing both a natural image and a CG image, complicated CG areas, an edge area of CG containing a plurality of pixel values, etc.

Next, the intrablock binary coding circuit 16 will be discussed. It adopts a coding technique for representing the whole block in two different values, an improvement of the block truncation coding technique. If the number of intrablock levels of a block is two or less, the two values become representative values of the block. That is, if the number of intrablock levels is two or less, the decoded image in the block coded in the two values in the block completely matches the original image and the same effect as reversible coding is produced. If the number of intrablock levels is three or more, the first two different values encountered are coded as representative values of the block.

The code data of the intrablock binary coding circuit 16 consists of two representative values of the block and pixel flags each indicating which of the two representative values the corresponding pixel is to be assigned to. Each of the two representative values is represented by eight bits. Each of the pixel flags can be one bit to indicate which of the two representative values the corresponding pixel is to be assigned to. For an 8×8-pixel block, the data amount of the pixel flags becomes $$8 \times 8 \times 1 \text{ bits} = 64 \text{ bits}$$

The data amount of the representative values becomes $$8 + 8 = 16 \text{ bits}$$

Therefore, the code data amount of the intrablock binary coding circuit 16 becomes $$64 + 16 = 80 \text{ bits}$$

Thus, the coding ratio becomes $$80/(8 \times 8 \times 8) = 1/6.4$$

The intrablock binary coding circuit 16 is applied to areas, each containing pixel values of about two different values in the block, requiring image quality of a comparatively high resolution, for example, an area containing an edge of text/line drawing, etc., an area containing halftone dots such as dither, a CG gradation area, etc.

Last, the block run length coding circuit 17 will be discussed. It adopts an improvement of the block truncation coding technique. If all pixel values in a block are the same and adjacent block images are the same, the whole block is represented by one value and the continuous blocks are represented by the number of the continuous blocks (run length).

If the number of intrablock levels of the block is one, the number of the same blocks which are continuous is counted and the number of the continuous blocks, namely, the run length is output as code. That is, if all pixel values in the block are the same, namely, the number of value types in the block is one, the average value of the block indicates the pixel values in the block intact. Thus, if the block contains uniform pixel values, the decoded image in the block coded in block length completely matches the original image and the same effect as reversible coding is produced.

In the embodiment, the code data amount of the block run length coding circuit 17 contains eight-bit data indicating an average value in a block and eight-bit data indicating the run length (16(=8+8) bits). Since the number of bits indicating the run length is eight, the maximum value of the run length is 256.

In the coding processing, if the run length is greater than 256, the block run length coding circuit 17 outputs code data with the run length 256 and outputs code of "the run length minus 256" as a new run length. In this case, the representative values are the same values. For example, if the run length is 500, code of the run length 256 and code of 244 (=500−256) are output. If the new run length resulting from the subtraction is greater than 256, again code of the run length 256 is output and substraction is repeated.

The coding ratio of the block run length coding circuit 17 varies depending on the run length value. The greater the run length, the higher the coding ratio; the smaller the run length, the lower the coding ratio. The minimum value of the run length is one. Since the original block size is eight X eight pixels, the coding ratio with the minimum value of the run length one is $$(8 \times 8)/(8 \times 8 \times 1) = 1/32$$

Thus, the coding ratio of the block run length coding circuit 17 becomes 1/32 or more.

The coding mode of the block run length coding circuit 17 is applied to areas where uniform pixel values are continuous over a wide range, such as a background area of an image, not requiring representation of a comparatively high resolution.

Figure 4:
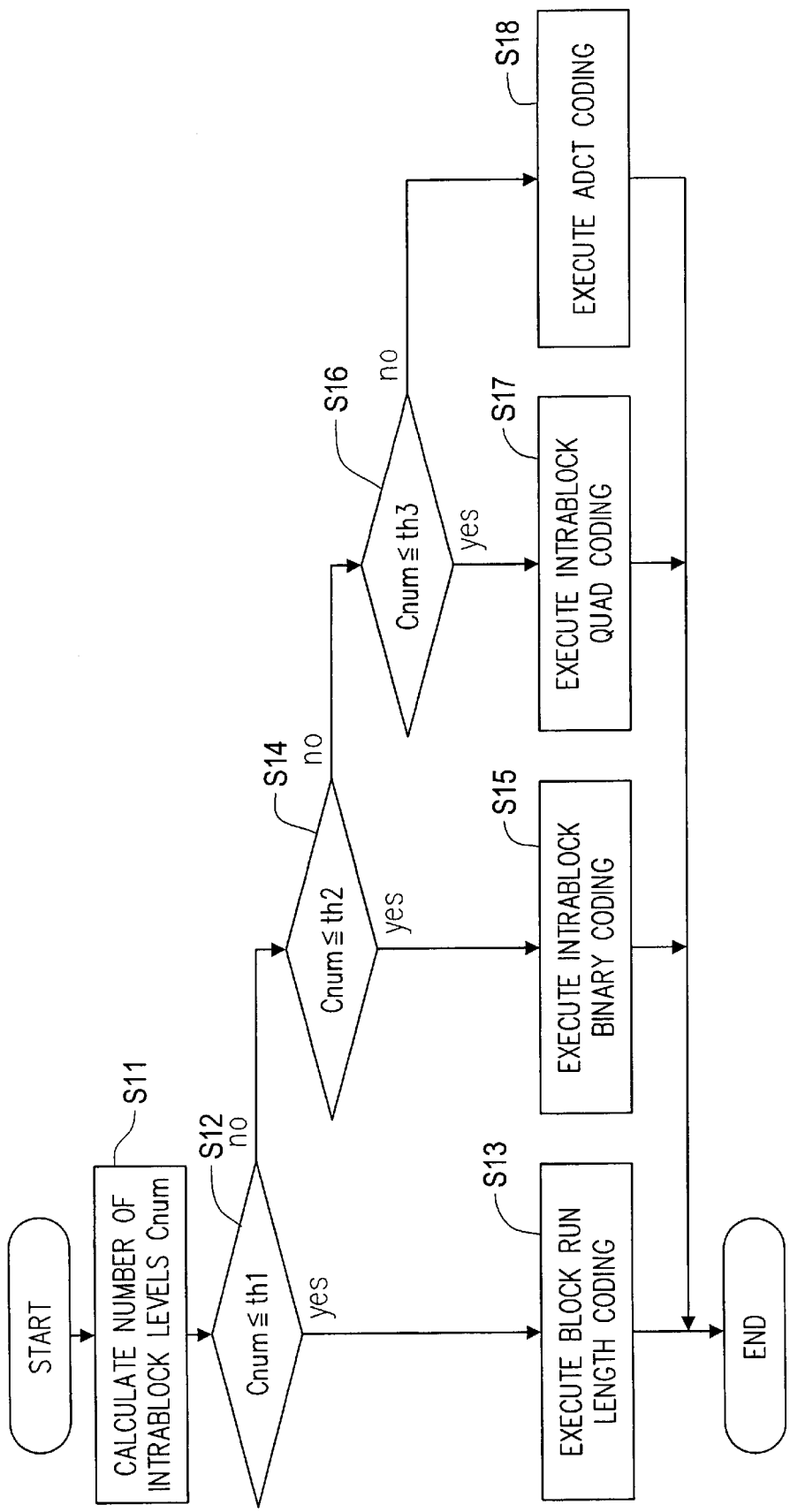
FIG. 4 is a flowchart of image characteristic determination according to the first embodiment of the invention.

Next, the image characteristic determination logic of the image characteristic determination circuit 13 will be discussed with reference to a determination logic flowchart shown in FIG. 4.

First, the number of intrablock levels Cnum is calculated as a characteristic value indicating an image characteristic for each block at step S11. Next, the number of intrablock levels Cnum is compared with a first threshold value th1 for the number of intrablock levels at step S12. If the number of intrablock levels Cnum is equal to or less than the threshold value th1, the block run length coding is applied to the block at step S13. Normally, one is set as the first threshold value th1. If the number of intrablock levels is one, namely, the block contains uniform pixel values, the block can be determined to be in an image area with no change in pixel values such as a background area, thus the block run length coding is applied.

If the number of intrablock levels Cnum is greater than the threshold value th1, it is compared with a second threshold value th2 for the number of intrablock levels at step S14. If the number of intrablock levels Cnum is equal to or less than the threshold value th2, the intrablock binary coding is applied at step S15. Normally, two is set as the second threshold value th2, because if the number of intrablock levels is two or less, reversible coding results if the intrablock binary coding is applied.

If the number of intrablock levels Cnum is greater than the threshold value th2, it is compared with a third threshold value th3 for the number of intrablock levels at step S16. If the number of intrablock levels Cnum is equal to or less than the threshold value th3, the intrablock quad coding is applied at step S17. Normally, four is set as the third threshold value th3, because if the number of intrablock levels is four or less, reversible coding results if the intrablock quad coding is applied. If the number of intrablock levels Cnum is greater than the threshold value th3, the ADCT coding is applied to the block.

According to the processing sequence, coding processing for 8×8-pixel block images can be distributed to any of the four coding techniques of the block run length coding, intrablock binary coding, intrablock quad coding, and ADCT coding based on the image characteristic of each block image.

The described image coding system 10 according to the embodiment can set a target minimum coding ratio, which is a setup value that if any image data is coded, the coding ratio does not become a value worse than the target minimum coding ratio. The target minimum coding ratio is calculated and set from the capacity of the storage medium for retaining coded data and the data amount of the original image and code data does not overflow the capacity of the storage medium, so that it does not cause trouble in the system operation and contributes to the stable operation of the system.

Figure 5:
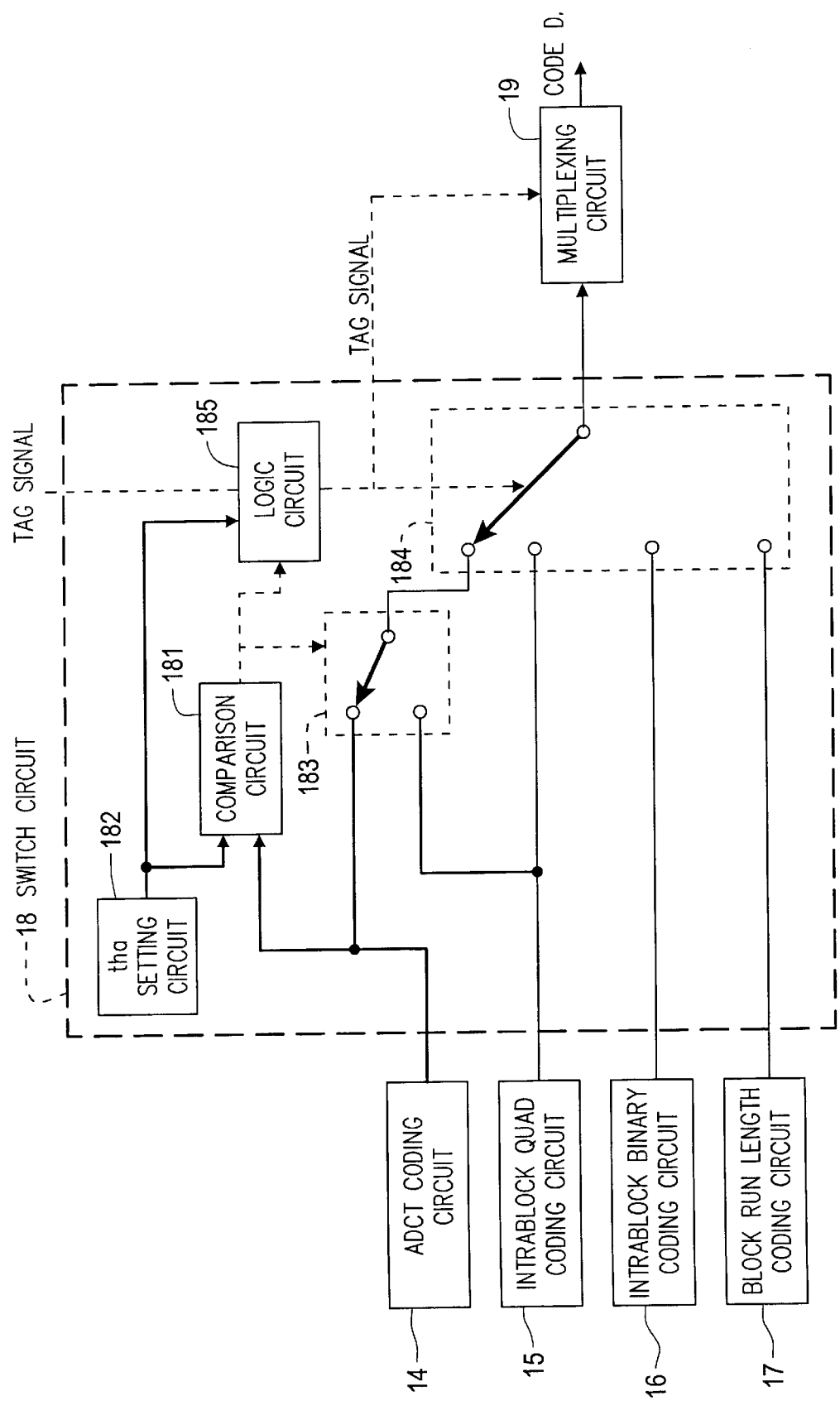
FIG. 5 is a block diagram to show a configuration example of a switch circuit according to the first embodiment of the invention.

The image coding system 10 according to the embodiment comprises a mechanism wherein if any image data is coded, the coding ratio becomes equal to or greater than the setup target minimum coding ratio, as described below:

FIG. 5 is a block diagram to show an example of the configuration of the switch circuit 18. The switch circuit 18 receives four code data pieces out put from the four coding circuits 14 to 17 and a tag signal output from the image characteristic determination circuit 13 and selects and outputs one of the four code data pieces based on the tag signal and the setup value of the target minimum coding ratio.

A coded data selection procedure will be discussed. In the embodiment, the coding ratios of the ADCT coding circuit 14, the intrablock quad coding circuit 15, the intrablock binary coding circuit 16, and the block run length coding circuit 17 are 1/1, 1/3.2, 1/6.4, and 1/32 or more respectively.

The intrablock binary coding and the intrablock quad coding are fixed-length coding wherein the coding ratio always becomes constant independently of the input image. The coding ratio of the block run length coding depends on the input image data, but the minimum coding ratio is 1/32 and the block run length coding is variable-length coding wherein the coding ratio always becomes 1/32 or more. The coding ratio of the ADCT coding depends greatly on the input image data. If the input image data is very complicated, the coding ratio of the ADCT coding is 1/1, in which case coding is impossible, namely, the effect of reducing the code amount by coding is not produced.

Which code data is to be output to an input image block is specified based on a tag signal from the image characteristic determination circuit 13. If the image characteristic determination circuit 13 determines ADCT coding all for the whole image, there is a possibility that the coding ratio of the whole image will be 1/1 (coding will be impossible). Thus, the switch circuit 17 comprises the following function:

As seen in FIG. 5, the switch circuit 18 has a comparison circuit 181, a tha (maximum code amount for each block) setting circuit 182, selectors 183 and 184, and a logic circuit 185. In the switch circuit 18, code data from the ADCT coding circuit 14 becomes one input of the comparison circuit 181. The maximum code amount for each block, tha, set by the tha setting circuit 182 is fed into the comparison circuit 181 as another input.

The tha setting circuit 182 sets the maximum code amount for each block, tha, from preset target minimum coding ratio of image, thcr. The comparison circuit 181 compares the code data amount of the ADCT coding circuit 14 with the maximum code amount for each block, tha, set by the tha setting circuit 182 and sends the comparison result to the selector 183 nd the logic circuit 185. The selector 183 inputs code data from the ADCT coding circuit 14 and code data from the intrablock quad coding circuit 15 and selects and outputs either code data based on the comparison result of the comparison circuit 181.

The selector 184 inputs the code data selected by the selector 183, code data from the intrablock quad coding circuit 15, code data from the intrablock binary coding circuit 16, and code data from the block run length coding circuit 17, selects any one code data based on a tag signal given from the logic circuit 185, and outputs the selected code data the multiplexing circuit 19. The logic circuit 185 changes a tag signal given from the image characteristic determination circuit 13 in FIG. 1 from ADCT coding to intrablock quad coding based on the comparison result of the comparison circuit 181 and supplies the resultant tag signal to the selector 184 as a switch control signal.

In the described switch circuit 18, if the comparison result of the comparison circuit 181 indicates that the ADCT code data amount is smaller than the maximum code amount for each block, tha, the selector 183 selects ADCT code data. The selected ADCT code data is further selected by the selector 184 and is output to the multiplexing circuit 19.

If the ADCT code data amount is greater than the maximum code amount for each block, tha, the selector 183 selects any other code data than ADCT code data. The code data to be selected varies depending on setting of the maximum code amount for each block, tha, namely, setting of the preset minimum coding ratio thcr.

If thcr≧1/3.2 and the ADCT code data amount is greater than the maximum code amount for each block, tha, code data of intrablock quad coding is selected in place of ADCT code data. Resultantly, the coding technique selection result for the block image differs from the determination result of the image characteristic determination circuit 13, thus needs to be reflected on the signal. To do this, the comparison result of the comparison circuit 181 is sent to the logic circuit 185.

The logic circuit 185 changes the tag signal for the block from ADCT coding to intrablock quad coding. Owing to the function, even if ADCT coding is selected, if the coding ratio is worse than the setup target minimum coding ratio, code data of intrablock quad coding of fixed-length coding with the coding ratio 1/3.2 is selected, so that the coding ratio always becomes the target minimum coding ratio or more.

If 1/6.4≦thcr<1/3.2, the logic circuit 185 changes the tag signal contents independently of the operation of the comparison circuit 181 and the selector 813. If the tag signal selects ADCT coding or intrablock quad coding, it is changed so as to select intrablock binary coding, whereby the input image is coded in intrablock binary coding or block run length coding. Since the intrablock binary coding is fixed-length coding with the coding ratio 1/6.4 and the block run length coding is variable-length coding with the minimum coding ratio 1/32, the setup value of the target minimum coding ratio thcr can be satisfied.

If thcr>1/6.4, the logic circuit 185 changes the tag signal contents independently of the operation of the comparison circuit 181 and the selector 813. In this case, the tag signal is changed so as to all select block run length coding, whereby all input images are coded in block run length coding. Since the block run length coding is variable-length coding with the minimum coding ratio 1/32, the setting of the target minimum coding ratio thcr can be satisfied.

By performing the described processing, the switch circuit 18 selects code data among code data from the four coding circuits, namely, the ADCT coding circuit 14, the intrablock quad coding circuit 15, the intrablock binary coding circuit 16, and the block run length coding circuit 17, and outputs the selected code data and the tag signal to the multiplexing circuit 19.

The multiplexing circuit 19 receives the code data and the tag signal output from the switch circuit 18, embeds the tag signal in the top of the code data, and outputs them as one code data. The code data containing the tag signal output from the multiplexing circuit 19 is stored in a storage medium of a buffer memory, hard disk, etc., or is transmitted to an image decoding system through a transmission channel.

Figure 6:
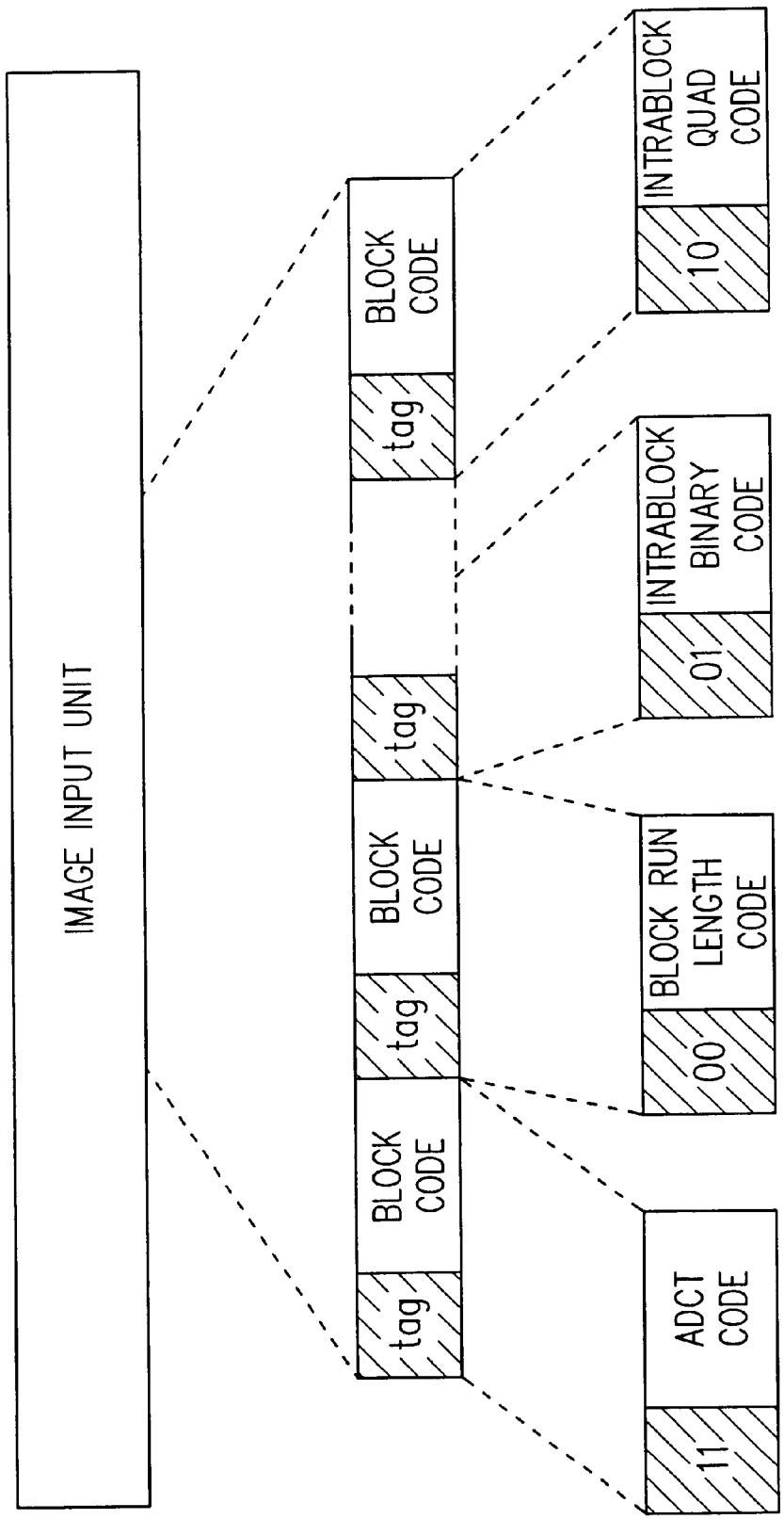
FIG. 6 shows a code data format according to the first embodiment of the invention.
Figure 7:
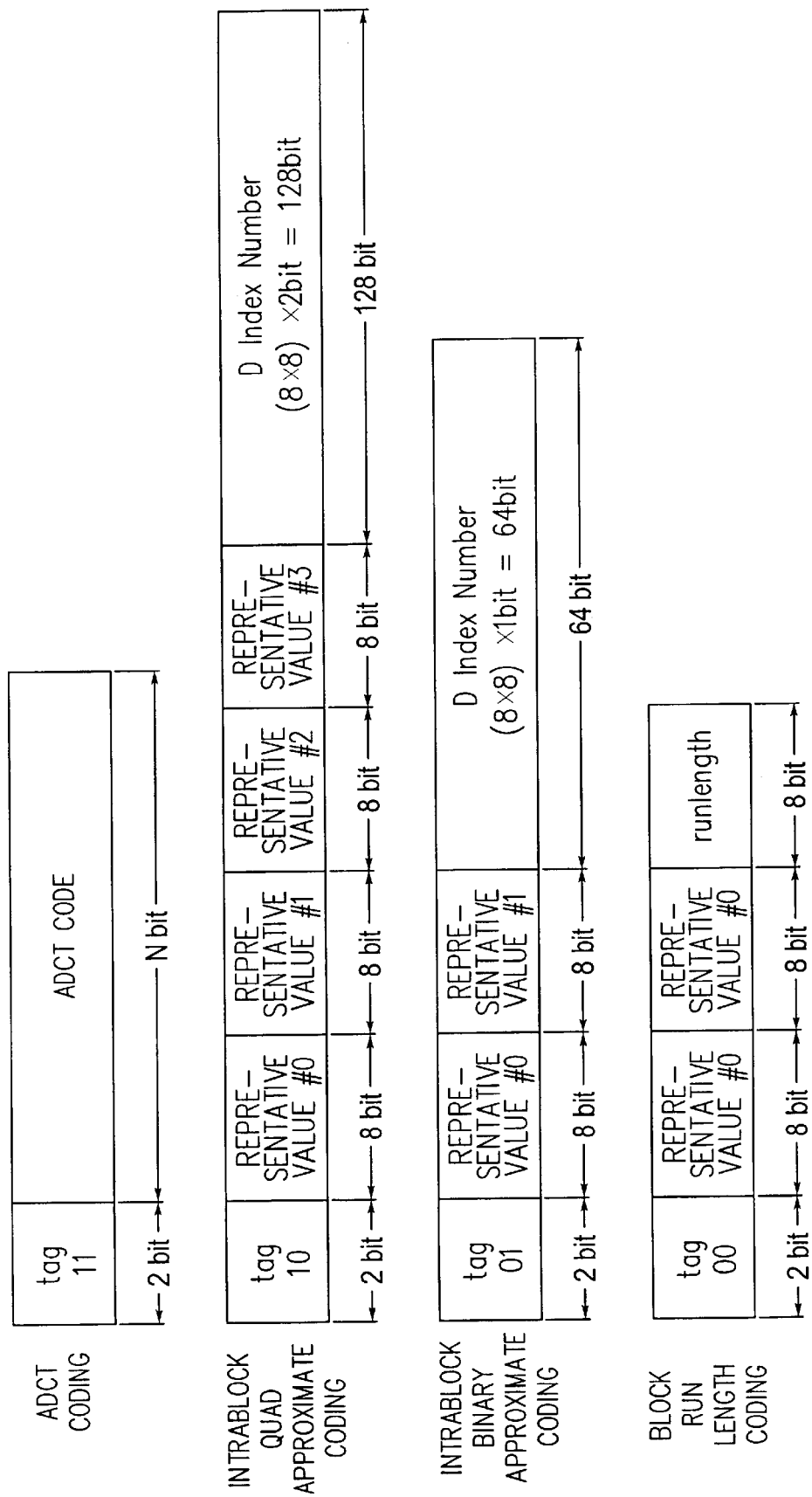
FIG. 7 shows the code data formats in more detail according to the first embodiment of the invention.

FIG. 6 shows a code data format in the embodiment. As shown here, code data is output for each block. The two-bit tag signal indicating the code data type is embedded in the top of the code data in each block. FIG. 7 shows the code data formats in detail.

As seen in FIG. 7, the code format of ADCT coding begins with a two-bit tag indicating ADCT coding, followed by ADCT code data. The code format of intrablock quad coding begins with a two-bit tag indicating the coding technique, followed by code data of intrablock quad coding. The code data begins with data of four block representative values, followed by 64(8×8) two-bit index numbers provided in a one-to-one correspondence with pixels, each indicating which representative value the corresponding pixel in the block is assigned to.

The code format of the intrablock binary coding technique begins with a two-bit tag indicating the coding technique, followed by two block representative values, followed by 64 one-bit index numbers provided in a one-to-one correspondence with pixels, each indicating which representative value the corresponding pixel in the block is assigned to. The code format of the block run length coding technique begins with a two-bit tag indicating the coding technique, followed by one block representative value and data indicating the run length.

Figure 8:
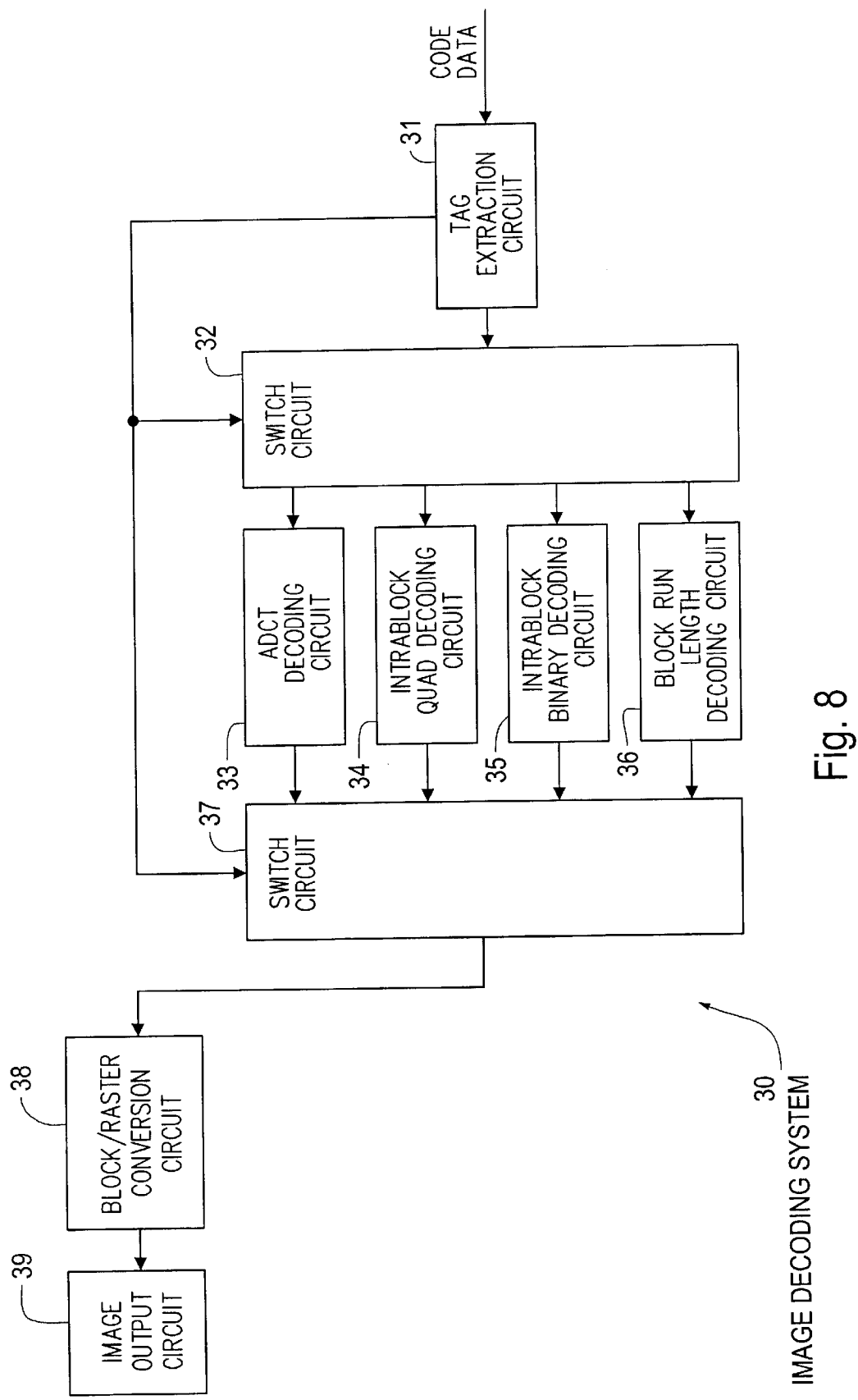
FIG. 8 is a block diagram to show a configuration example of an image decoding system according to the first embodiment of the invention.

FIG. 8 is a block diagram to show a configuration example of an image decoding system in the image processing system according to the first embodiment of the invention.

As seen in FIG. 8, an image decoding system 30 according to the first embodiment has a tag extraction circuit 31, a switch circuit 32, an ADCT decoding circuit 33, an intrablock quad decoding circuit 34, an intrablock binary decoding circuit 35, a block run length decoding circuit 36, a switch circuit 37, a block/raster conversion circuit 38, and an image output unit 39.

In the described image decoding system 30, the tag extraction circuit 31 inputs code data stored in a storage medium of a buffer memory, hard disk, etc., or transmitted through the transmission channel from the image coding system 10. As described above, the code data is formatted for each block and a two-bit tag signal indicating which coding technique the code data is coded in is entered in the top of the code data for each block. The tag extraction circuit 31 extracts the tag signal from the code data and separates the tag signal and the remaining code data, then outputs. The separated tag signal is supplied to the switch circuits 32 and 37.

The switch circuit 32 receives the tag signal and the code data from which the tag signal is extracted from the tag extraction circuit 31, selects one of the four decoding circuits, namely, the ADCT decoding circuit 33, the intrablock quad decoding circuit 34, the intrablock binary decoding circuit 35, and the block run length decoding circuit 36 based on the received tag signal, and outputs the received code data to the selected decoding circuit.

Upon reception of the code data, the ADCT decoding circuit 33, the intrablock quad decoding circuit 34, the intrablock binary decoding circuit 35, or the block run length decoding circuit 36 decodes the code data and reproduces a block image. The decoding circuits will be discussed specifically.

Figure 9:
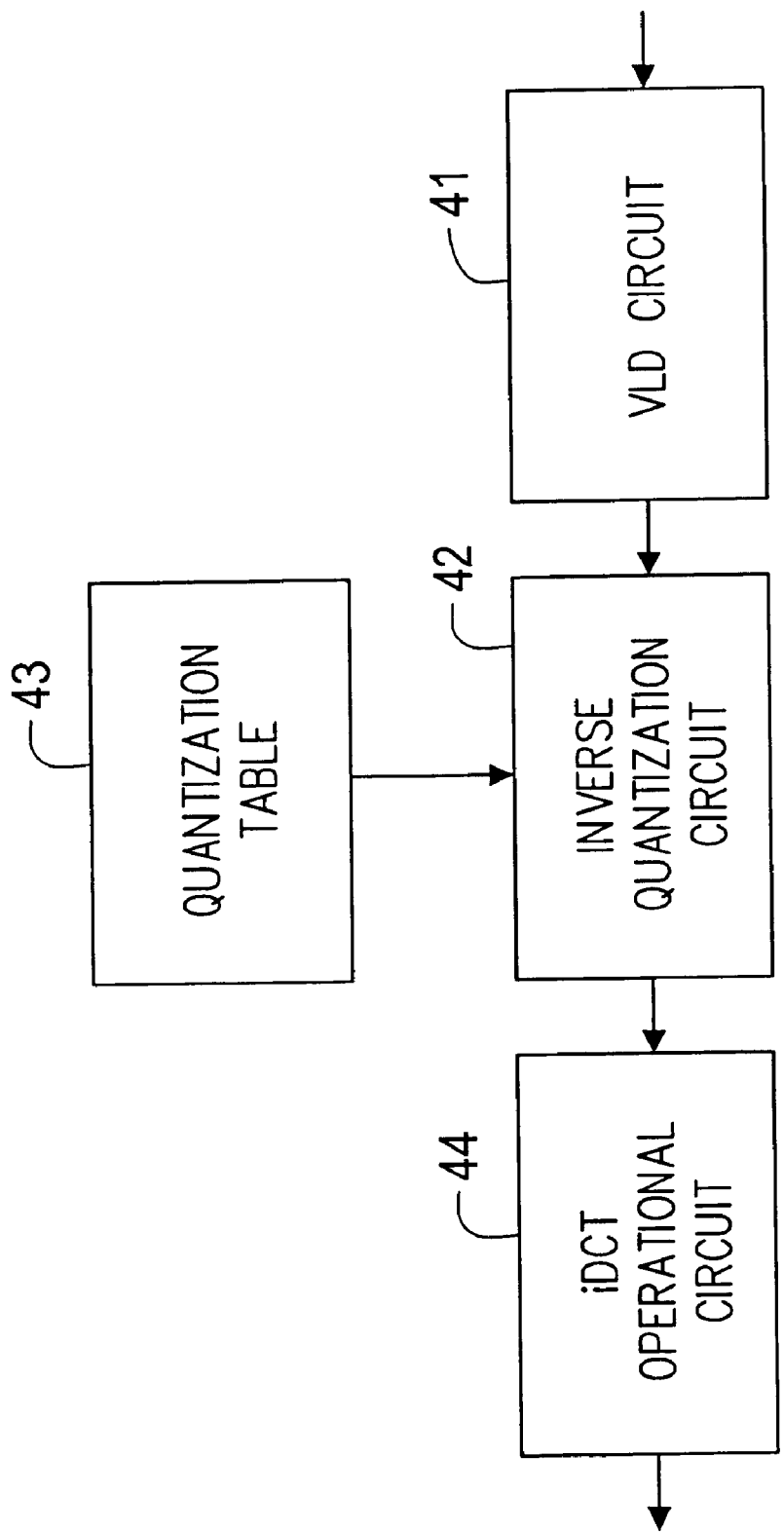
FIG. 9 is a block diagram to show a configuration example of an ADCT decoding circuit according to the first embodiment of the invention.

First, FIG. 9 is a block diagram to show a configuration example of the ADCT decoding circuit 33. As shown here, the ADCT decoding circuit 33 has a VLD circuit 41, an inverse quantization circuit 42, a quantization table 43, and an iDCT operational circuit 44. In the ADCT decoding circuit 33, the VLD circuit 41 performs Huffman decoding processing and reconstitutes the input code data to frequency data after quantization.

The inverse quantization circuit 42 receives the frequency data after quantization output by the VLD circuit 41 and performs inverse quantization. The quantization table used at the coding time is used as the quantization table 43 used for the inverse quantization. The iDCT operational circuit 44 executes iDTC of the frequency data supplied from the inverse quantization circuit 42 into a block image and outputs the block image.

The intrablock quad decoding circuit 34 receives 160-bit code data and interprets the top 32 (=8×4) bits as four block representative values. Each of the block representative values consists of eight bits. The intrablock quad decoding circuit 34 disassembles the remaining 128-bit data into 64 parts each two bits in a one-to-one correspondence with 64 (=8×8) pixels making up one block as two-bit flags each indicting the representative value corresponding to the position of each pixel. It references the flag for each pixel, assigns the corresponding one of the four representative values to each pixel, and outputs one-block image data.

The intrablock binary decoding circuit 35 receives 80-bit code data and interprets the top eight bits as the first block representative value and the next eight bits as the second block representative value. It disassembles the remaining 64-bit data into 64 parts each one bit in a one-to-one correspondence with 64 (=8×8) pixels making up one block as flags each indicting the representative value corresponding to the position of each pixel. The intrablock binary decoding circuit 35 references the flag for each pixel. If the flag is "0," the intrablock binary decoding circuit 35 assigns the first representative value to the pixel at the position; if the flag is "1, " the intrablock binary decoding circuit 35 assigns the second representative value to the pixel at the position. It repeats the work for one block and outputs one-block image data.

To decode the data coded in the block run length technique, the block run length decoding circuit 36 receives 16-bit data and interprets the top eight-bit data as the block representative value and the remaining eight-bit data as the run length. The decoding circuit 36 outputs whole filled-in 8×8-pixel blocks based on the representative value as many as the run length repeatedly.

The switch circuit 37 receives the tag signal sent from the tag extraction circuit 31, selects one of the four decoding circuits 33–36 based on the tag signal, receives image data from the selected decoding circuit, and sends the received block image data to the block/raster conversion circuit 38, which then converts the block image received from the switch circuit 37 into one original raster image data and sends the raster image data to the image output unit 39.

The image output unit 39 may be a unit for outputting image data onto paper, such as a printer or a plotter, a display unit for displaying an image, a unit for outputting a raster image directly to memory, or a unit for outputting image data to a network.

In the described image processing system according to the first embodiment, the image coding system 10 receives raster-expanded image data, performs image coding processing for the data, and outputs code data. On the other hand, the image decoding system 30 receives the code data, performs image decoding processing for the data, and outputs raster image data. At this time, if the image contains mixed image areas greatly different in image characteristic, such as CG image and natural image areas, efficient coding can be executed. If a small code data memory capacity is available, code data can always be contained within the memory capacity by setting the target minimum coding ratio, and in addition, a high-quality decoded image can be provided and necessary hardware can be realized in a comparatively simple processing scale.

According to this, it is possible to provide with an image coding system comprising:

block division means for dividing an input image into blocks each containing a plurality of pixels; and variable-length coding means for performing variable-length coding for the input image, said variable-length coding means including means for generating cutoff signal, if the code amount is over a threshold value.

Figure 10:
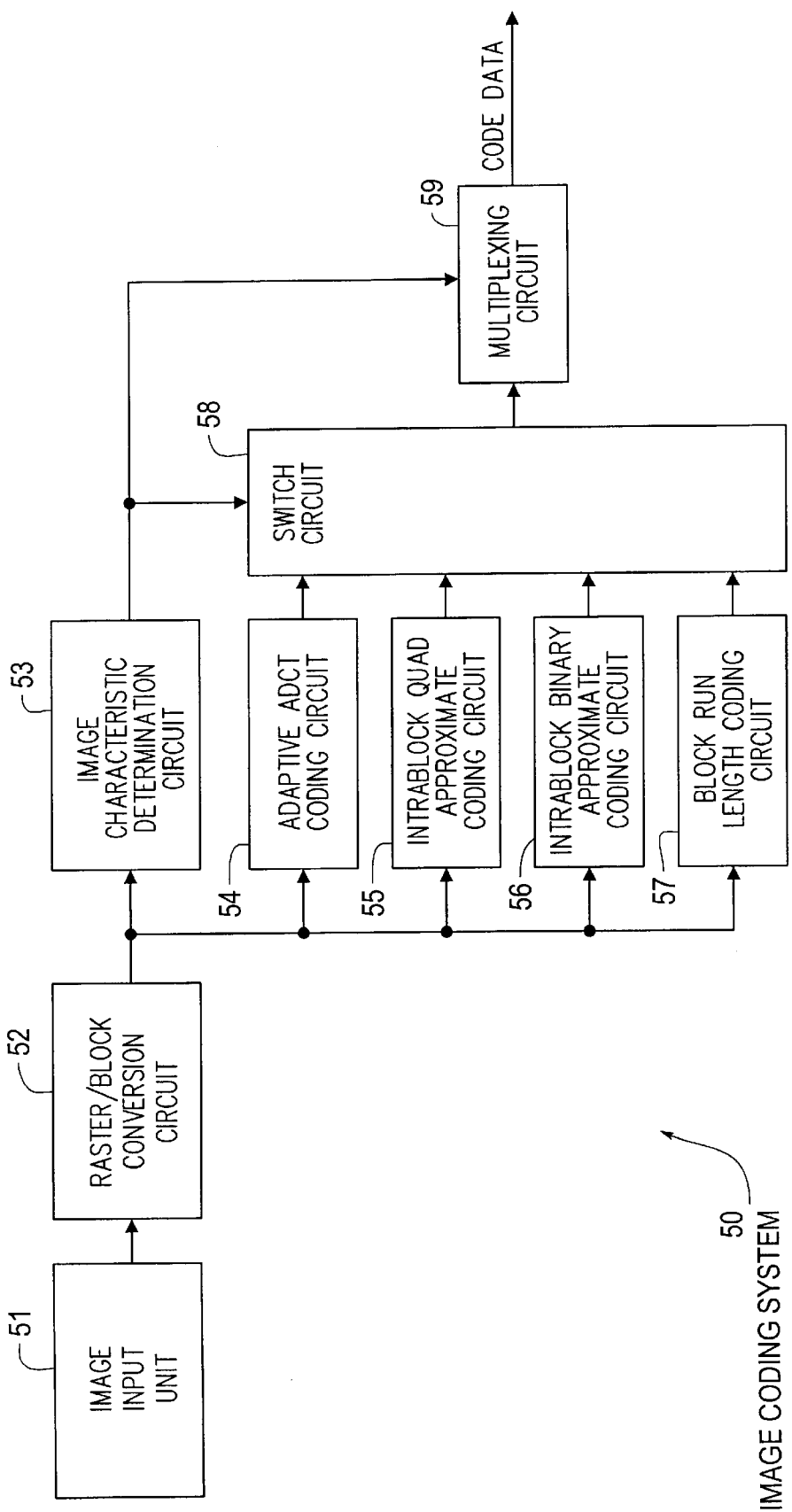
FIG. 10 is a block diagram to show a configuration example of an image coding system according to a second embodiment of the invention.

FIG. 10 is a block diagram to show a configuration example of an image coding system in an image processing system according to a second embodiment of the invention.

As seen in FIG. 10, an image coding system 50 according to the second embodiment comprises an image input unit 51, a raster/block conversion circuit 52, an image characteristic determination circuit 53, an adaptive ADCT coding circuit 54, an intrablock quad approximate coding circuit 55, an intrablock binary approximate coding circuit 56, a block run length coding circuit 57, a switch circuit 58, and a multiplexing circuit 59.

In the described image coding system 50, the image input unit 51, which is an interface for receiving a raster image, receives image data directly as a raster image of digital data from an external network, etc., like an external interface or raster data from a printer controller for outputting raster image prepared from PostScript. The image data input from the image input unit 51 is sent to the raster/block conversion circuit 52.

The raster/block conversion circuit 52 divides the input image data into block images each consisting of 8×8 pixels, for example, and outputs the block images. When the width of an image is not a multiple of eight, pixel data of less than 8×8 pixels occurs in an edge of the image. In this case, the raster/block conversion circuit 52 adds dummy pixels so as to form 8×8 pixels and outputs 8×8-pixel block image data. The image data of the block images is sent to the image characteristic determination circuit 53 and also to four coding circuits 54 to 57.

The image characteristic determination circuit 53 receives each block image output from the raster/block conversion circuit 52, references the pixel value distribution state in the block, and analyzes the image characteristic of the input block image. The image characteristic contained in the block is an index indicating the feature of the block image, for example, indicating that the block image is a natural image area, a CG image area, or an area containing both natural and CG image areas. From the analysis result of the image characteristic, the image characteristic determination circuit 53 determines which of the coding techniques of the four coding circuits 54–57 is optimum for the block image, and outputs the determination result as a tag signal.

Specifically, to analyze the image characteristic, the image characteristic determination circuit 53 calculates the characteristic value indicating the image characteristic for each block and determines the image characteristic from the state of the characteristic value. In the embodiment, the number of intrablock levels, a dynamic range, the number of inversion times, a high-density distribution frequency, and a low-density distribution frequency are used as the characteristic values. The contents of the characteristic values will be discussed.

First, the number of intrablock levels is a numeric value indicating how many types of values exist in an 8×8-pixel block. It is one index indicating complicity of the pixel value distribution of the block image. For example, if a block contains all uniform values, such as a block in a background area of image data, the number of intrablock levels becomes one.

If a block contains two different values (namely, background color and drawing color), such as a block containing a straight line drawn in a white background, the number of intrablock levels becomes two. For a block of a photo, etc., values change complicatedly, thus the number of intrablock levels becomes a large value. This characteristic is used to analyze the image characteristic for each block. Since the block size is 8×8 pixels, the maximum value of the number of intrablock levels is 64.

Figure 11:
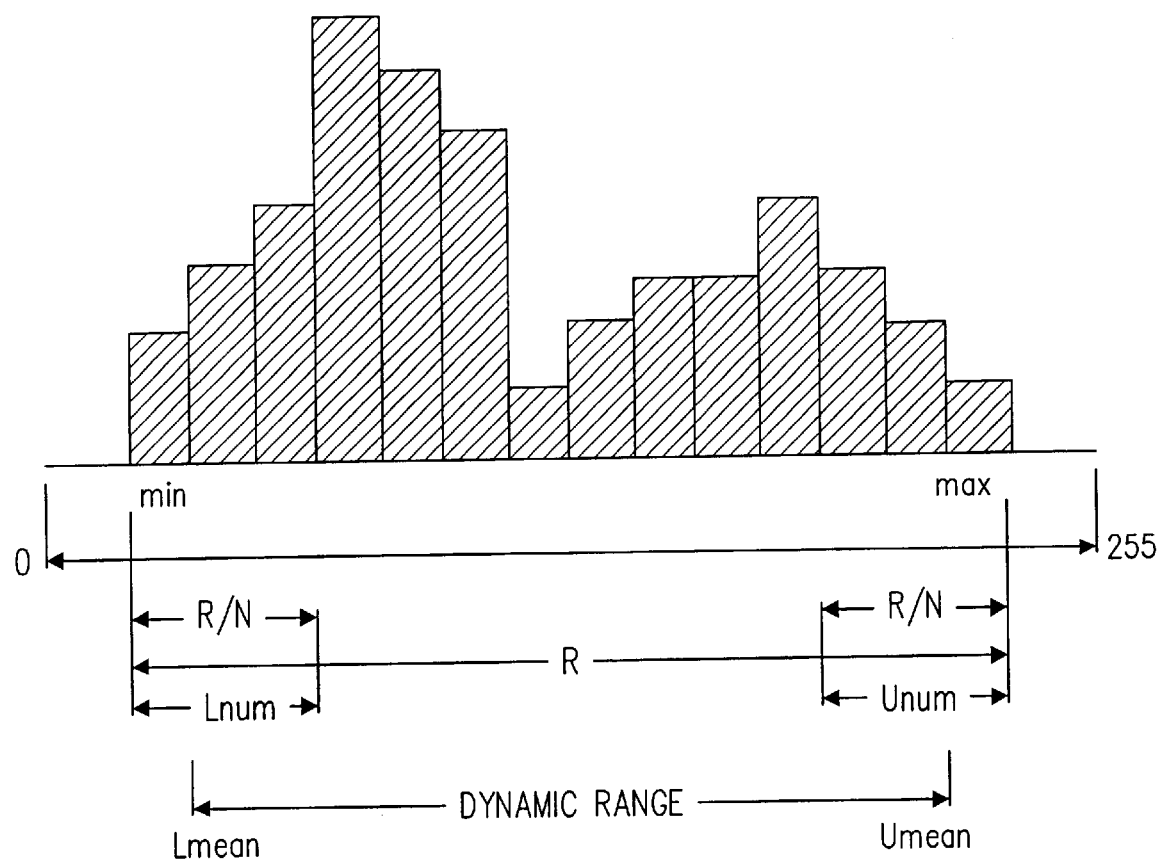
FIG. 11 is a conceptual diagram of high-density and low-density distribution frequencies according to the second embodiment of the invention.

The high-density distribution frequency is the number of pixel values in a high-density area in a histogram distribution of pixel values in a block and the low-density distribution frequency is the number of pixel values in a low-density area in a histogram distribution of pixel values in a block. To find the high-density distribution frequency and the low-density distribution frequency, first a histogram distribution of pixel values in a block is found. FIG. 11 shows the histogram distribution. The difference between the maximum value max and minimum value min of the histogram distribution, namely, |max-min| is R.

Assuming that the total values of the frequencies existing in ranges in the neighborhoods of the maximum value and the minimum value of the histogram distribution are Unum and Lnum, the ranges for finding Unum and Lnum are ranges of 1/N the difference R. N is a value of two or more; in the embodiment, a value of N=about 6–8 is used. Resultantly, the ranges of Unum and Lnum are as follows:

$$Unum: (\max-R/N) \leq x \leq \max$$

$$Lnum: \min \leq x \leq (\min+R/N)$$

The Unum is used as the high-density distribution frequency and the Lnum is used as the low-density distribution frequency. If the high-density distribution frequency Unum is large, there is a possibility that the pixel value distribution in the block may lean to the high-density neighborhood. If the low-density distribution frequency Lnum is large, there is a possibility that the pixel value distribution in the block may lean to the low-density neighborhood. If both the high-density distribution frequency Unum and the low-density distribution frequency Lnum are large, there is a possibility that the pixel value distribution may lean to the high density and the low density. Thus, a block with the pixel value distribution leaning to one side has a large possibility that it may contain edges. Such a characteristic is used to analyze the image characteristic.

Next, the dynamic range found in the embodiment is not the absolute value of the difference between the maximum value and the minimum value and is the absolute value of the difference between a distribution average value of high-density area and a distribution average value of low-density area in a histogram distribution of pixel values in a block. FIG. 11 is a conceptual diagram.

To find the distribution average value of high-density area, the above-mentioned high-density distribution frequency Unum is found, then the average value in the range to which the frequency belongs is adopted as Umean. To find the distribution average value of low-density area, likewise the low-density distribution frequency Lnum is found, then the average value in the range to which the frequency belongs is adopted as Lmean. Based on the average values Umean and Lmean thus found, the dynamic range is defined by the following expression:

$$\text{Dynamic range} = |U\text{mean} - L\text{mean}|$$

If the value of the dynamic range is large, there is a possibility that the block image may have a high contrast and contain an edge area of text/line drawing, etc. If the value of the dynamic range is small, there is a possibility that the block image may have pixel values changing moderately and contain gradation or background area. Such characteristics are used to analyze the image characteristic.

Figure 12C:
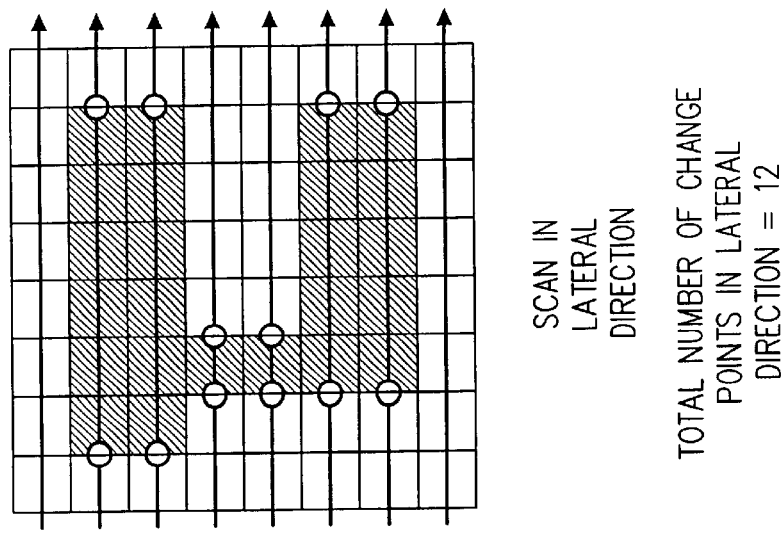
FIGS. 12A to 12C are conceptual diagrams of the number of inversion times according to the second embodiment of the invention.

The number of inversion times is found as follows: A block image is binarized according to the average value in the block. When the binarized image is scanned in a lateral direction and a longitudinal direction, the value change points are counted. The total count in the lateral direction and that in the longitudinal direction are added together to find the number of inversion times. FIG. 12 shows an outline. FIG. 12A shows an image provided by binarizing a block image.

Figure 12B:
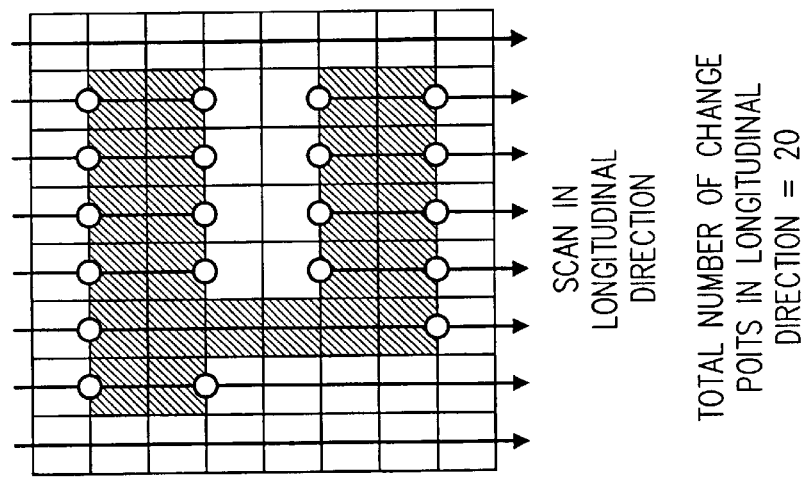
Figure 12A:
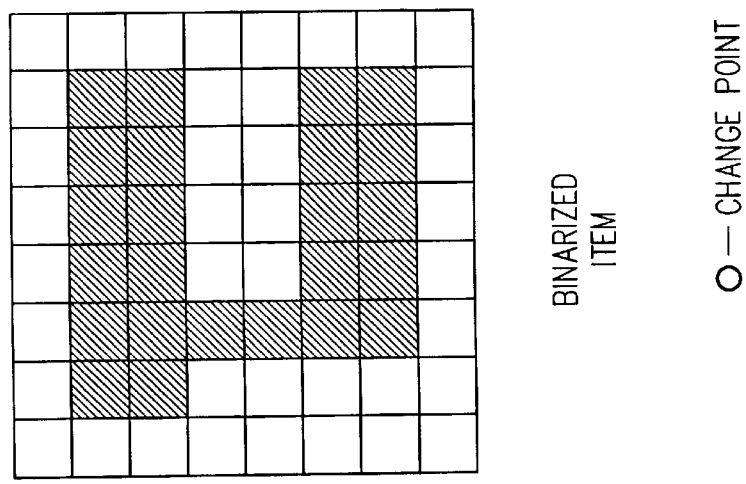

When the binarized image is scanned in the longitudinal direction as shown in FIG. 12B, no change occurs in scanning of the first column. When the next column is scanned, there is a point changing from a pixel value indicating a background to a pixel value indicating a drawing color at a place where change is made from the first pixel to the second pixel. The point is called a change point. When the scanning is advanced in a similar manner, there is a point changing from the drawing color to the background color at a place where change is made from the third pixel to the fourth pixel. The point is also called a change point. As the scanning is thus advanced in the column direction, the change points can be detected as shown in FIG. 12B. The number of the change points is counted.

Next, the binarized image is scanned in the lateral direction as shown in FIG. 12C. As with the scanning in the longitudinal direction, change points are detected and the number of the change points is counted. The total number of the change points in the longitudinal direction and that in the lateral direction are added and the result is adopted for the number of inversion times.

Figure 13B:
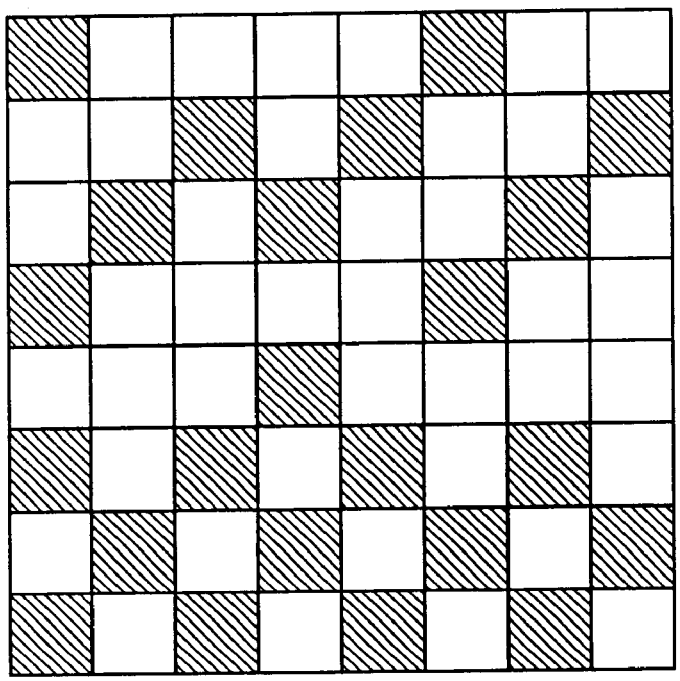
FIGS. 13A and 13B are illustrations to show examples of the number of inversion times.
Figure 13A:
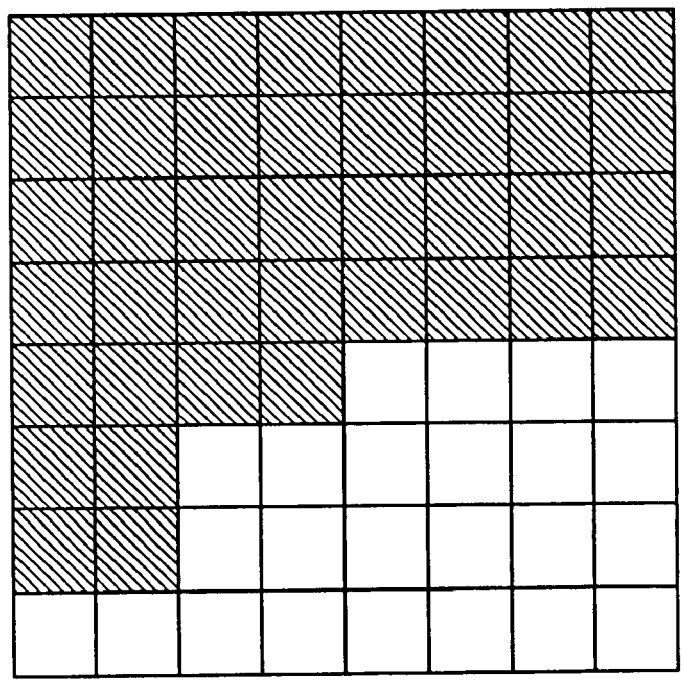

FIG. 13A shows an image example provided by binarizing a block containing text and line drawing edges and FIG. 13B shows an image example provided by binarizing a halftone dot image such as a photo. If the value of the number of inversion times in a block containing an edge area of text, etc., is compared with the value of the number of inversion times in a block containing a halftone dot area of a photo, etc., experimentally the number of inversion times in the edge area tends to be smaller than that in the halftone dot area. This characteristic is used to analyze the image characteristic for each block.

The four coding circuits, namely, the adaptive ADCT coding circuit 54, the intrablock quad approximate coding circuit 55, the intrablock binary approximate coding circuit 56, and the block run length coding circuit 57 receive each block image output by the raster/block conversion circuit 52 and perform coding processing for the block image.

Of these coding circuits 54–57, the intrablock quad approximate coding circuit 55 adopts reversible coding if the number of pixel value types in a block is four or less; the intrablock binary approximate coding circuit 56 adopts reversible coding if the number of pixel value types in a block is two or less. The block run length coding circuit 57 also adopts reversible coding if the number of pixel value types in a block is one, namely, the pixel values in the block are uniform.

Considering the characteristic that reversible coding is applied if the number of pixel value types in a block is a given value or less, and the above-described characteristic values of a block image, the image characteristic determination circuit 53 determines which of the coding techniques of the four coding circuits 54–57 is optimum for the block image. FIG. 14 is a logic flowchart of image characteristic determination.

First, the above-described image characteristic values for each block are calculated at step S21. Here, assume that the image characteristic values are represented as follows: The number of intrablock levels (number of colors) is represented as Cnum, the dynamic range as range, the number of inversion times as BWcnt, the high-density distribution frequency as Unum, and the low-density distribution frequency as Lnum.

Next, the number of intrablock levels Cnum is compared with a threshold value th1 for the number of intrablock levels at step S22. If Cnum≦th1, the block run length coding is set at step S23. Normally, one is set as the threshold value th1. If the number of intrablock levels, Cnum, is one, namely, the block contains uniform pixel values, the block can be determined to be in an image area with no change in pixel values such as a background area, thus the block run length coding is applied. When the number of intrablock levels, Cnum, is one or less, the block run length coding can provide image quality similar to that of reversible coding.

If Cnum>th1, the dynamic range range is compared with a threshold value p1 for the dynamic range at step S24. If range ≦p1, control goes to step S23 and the block run length coding is set. This means that if the dynamic range in the block, range, is small, the block run length coding is applied even if the number of intrablock levels, Cnum, is large. That is, the block run length coding is applied to a block in which the pixel values less change, whereby the code amount is reduced and a high coding ratio is realized.

Next, the number of intrablock levels Cnum is compared with a threshold value th2 for the number of intrablock levels at step S25. If Cnum≦th2, the intrablock binary approximate coding is set at step S26. Normally, two is set as the threshold value th2, because if the number of intrablock levels, Cnum, is two or less, reversible coding results if the intrablock binary approximate coding is applied.

If Cnum>th2, the dynamic range range is compared with a threshold value p2 for the dynamic range at step S27. If range ≦p2, control goes to step S26 and the intrablock binary approximate coding is set. This means that if the dynamic range in the block, range, is very small, the intrablock binary approximate coding is applied even if the number of intrablock levels, Cnum, is large.

Next, the number of intrablock levels, Cnum, is compared with a threshold value th3 for the number of intrablock levels at step S28. If Cnum≦th3, the intrablock quad approximate coding is set at step S29. Normally, four is set as the third threshold value th3, because if the number of intrablock levels, Cnum, is four or less, reversible coding results if the intrablock quad approximate coding is applied.

If Cnum>th3, the number of inversion times, BWcnt, is compared with a threshold value p5 for the number of inversion times at step S30. If BWcnt≧p5, the adaptive ADCT coding is applied to the block at step S31. If BWcnt<p5, the dynamic range range is compared with a threshold value p3 for the dynamic range at step S32. If range≦p3, control goes to step S29 and the intrablock quad approximate coding is set. This means that if the dynamic range range is small, the intrablock quad approximate coding is applied.

If range>p3, the high-density distribution frequency Unum is compared with a threshold value p4 for the high-density distribution frequency at step S33. If Unum>p4, control goes to step S29 and the intrablock quad approximate coding is applied. If Unum≦p4, the low-density distribution frequency Lnum is compared with the same threshold value p4 at step S34. If Lnum>p4, control goes to step S29 and the intrablock quad approximate coding is applied. If Lnum≦p4, control goes to step S31 and the adaptive ADCT coding is applied.

According to the described processing sequence, any one of the four coding techniques, namely, the block run length coding technique, the intrablock binary approximate coding technique, the intrablock quad approximate coding technique, or the adaptive ADCT coding technique is distributed to each 8×8-pixel block image based on the image characteristic of the block image.

The four coding circuits 54–57 receive each block image output from the raster/block conversion circuit 52 and perform coding processing for the block image separately. The coding technique used with the adaptive ADCT coding circuit 54 is an improvement of a coding technique generally called ADCT coding technique. The coding techniques used with the coding circuits 55–57 are improvements of a technique generally called block truncation (BTC) coding technique. The coding circuits will be discussed in detail.

First, the ADCT coding circuit 54 will be discussed. It adopts coding technique typified by JPEG baseline technique, variable-length coding system with the output code data amount changing in response to the complicity of input image data, and irreversible coding technique that can control the quality and coding ratio of the coded image to some extent by setting a coding parameter.

To execute ADCT coding, an image is divided into blocks, DCT is executed for each block, the DCT coefficients are quantized, and the quantized DCT code is Huffman coded. The Huffman coding at the last stage is variable-length coding and the ADCT coding is irreversible variable-length coding.

That is, as with the above-described reversible coding, the coding ratio changes in response to the image to be coded and the minimum coding ratio becomes 1/1 in the ADCT coding. Thus, as with the reversible coding, the code data memory capacity needs to be provided as the same size as the original image, and large-capacity code memory needs to be installed.

The adaptive ADCT coding according to the embodiment is a coding technique provided by adding two additional functions to the ADCT coding technique. One of the additional functions is an adaptive quantization function and the other is a code amount cutoff function.

The adaptive quantization function is intended for providing a decoded image with high quality. The frequency characteristic of input block image data is analyzed and a quantization table optimum for the characteristic of the image data is selected from among provided quantization tables, thereby performing adaptive quantization.

Figure 15:
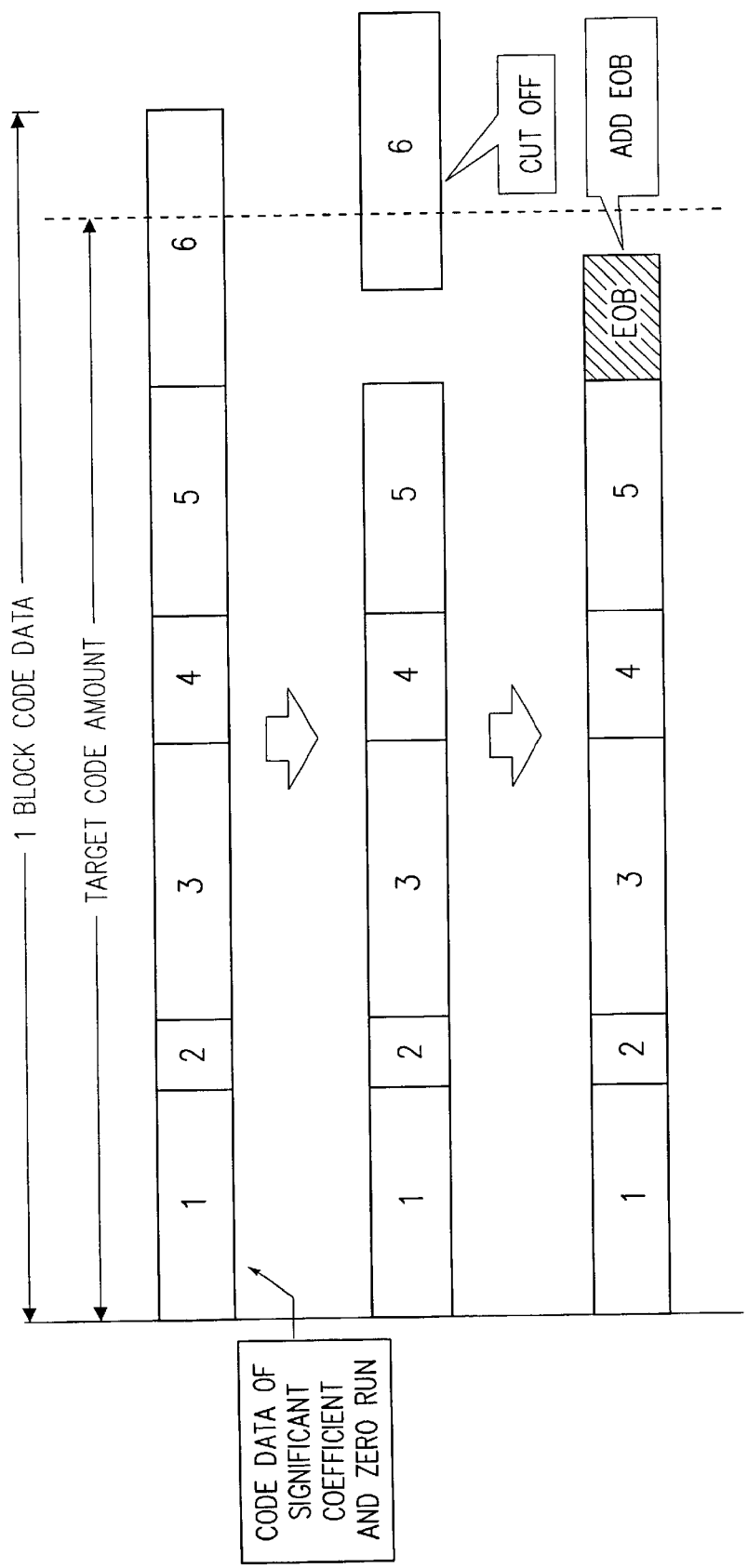
FIG. 15 is a conceptual diagram of code cutoff of adaptive ADCT coding according to the second embodiment of the invention.

On the other hand, the code amount cutoff function is intended for controlling the maximum code amount for each block. FIG. 15 is a conceptual diagram of the code amount cutoff function. The code amount for each block is counted and is compared with a prespecified target code amount. If the code amount for each block is greater than the target code amount, the code data is cut off so that it becomes the target code amount or less, and an EOB (End of Block) signal is forcibly generated.

Figure 16:
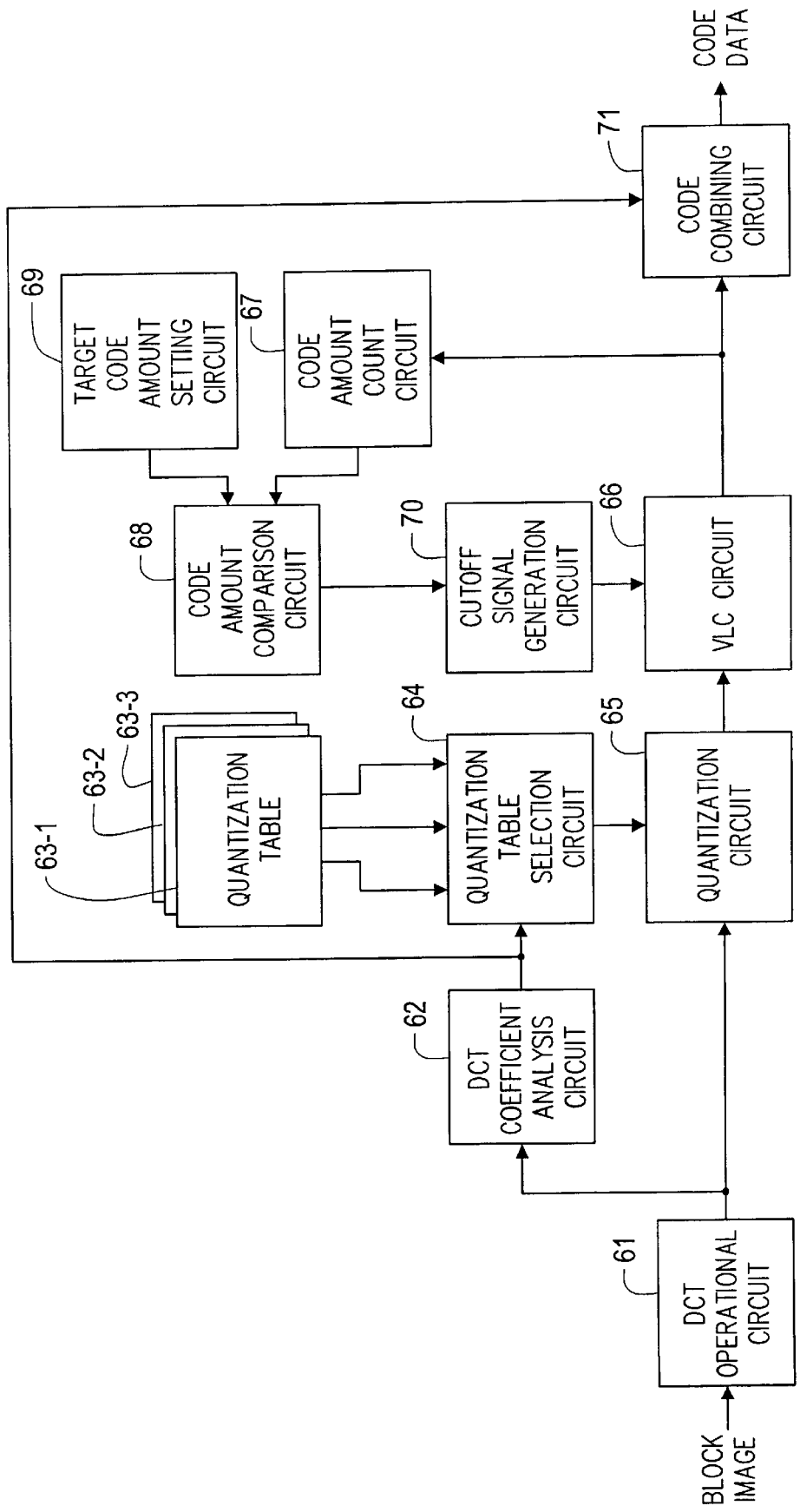
FIG. 16 is a block diagram to show a configuration example of an adaptive ADCT coding circuit according to the second embodiment of the invention.

FIG. 16 is a block diagram to show a configuration example of the adaptive ADCT coding circuit 54. As shown here, the adaptive ADCT coding circuit 54 has a DCT operational circuit 61, a DCT coefficient analysis circuit 62, quantization tables 63-1, 63-2, and 63-3, a quantization table selection circuit 64, a quantization circuit 65, a VLC circuit 66, a code amount count circuit 67, a code amount comparison circuit 68, a target code amount setting circuit 69, a cutoff signal generation circuit 70, and a code combining circuit 71.

In the described adaptive ADCT coding circuit 54, the DCT operational circuit 61 inputs a block image output from the raster/block conversion circuit 52, executes DCT of the block image, and converts the image data into frequency data. FIG. 3A shows an example of the block image and FIG. 3B shows an example of DCT coefficient data. The frequency data is sent to the DCT coefficient analysis circuit 62.

The DCT coefficient analysis circuit 62 analyzes the frequency components of the image data and selects a quantization table optimum for the block image from among the quantization tables. In the embodiment, the three quantization tables 63-1, 63-2, and 63-3 are provided. The quantization table 63-1 is a quantization table optimized for images containing edges, the quantization table 63-2 is a quantization table optimized for halftone dot images such as photos, and the quantization table 63-3 is a quantization table with a large quantization width so as to provide a high coding ratio. FIGS. 17A, 17B, and 17C show examples of the quantization tables.

The quantization table selection circuit 64 references the analysis result of the DCT coefficient analysis circuit 62 and selects one of the three quantization tables 63-1, 63-2, and 63-3. The quantization circuit 65 receives the frequency data output from the DCT operational circuit 61 and uses the quantization table 63-1, 63-2, or 63-3 selected by the quantization table selection circuit 64 to quantize the frequency data.

The VLC circuit 66 Huffman codes the quantized frequency data. That is, the VLC circuit 66 converts the quantized frequency data into sets of numerals (zero run) with continuous insignificant coefficients (value of zero) and significant coefficients (not zero) and outputs one code data. More than one code data makes up one-block code data.

The code amount count circuit 67 adds and counts the code data output from the VLC circuit 66. The code amount comparison circuit 68 sequentially compares the code amount counted by the code amount count circuit 67 with the target code amount preset by the target code amount setting circuit 69. The cutoff signal generation circuit 70 realizes the above-described code cutoff function based on the comparison result of the code amount comparison circuit 68.

That is, the cutoff signal generation circuit 70 deletes the code data of significant coefficient and zero run last output from the VLC circuit 66 and instead outputs an EOB signal based on the comparison result of the code amount comparison circuit 68 when the code amount counted by the code amount count circuit 67 exceeds the target code amount. The EOB signal is output for preventing cutoff of the code data from resulting in a mismatch of the code data.

The code combining circuit 71 adds a tag signal indicating the used quantization table sent from the DCT coefficient analysis circuit 62 to the code data output from the VLC circuit 66 and outputs the final code data.

Next, the intrablock quad approximate coding circuit 55 will be discussed. It adopts a coding technique for representing the whole block in four different values, an improvement of the block truncation coding technique. If the number of intrablock levels of a block is four or less, the four values become representative values of the block.

That is, if the number of intrablock levels is four or less, the decoded image in the block coded in the four values in the block completely matches the original image and the same effect as reversible coding is produced. If the number of intrablock levels is five or more, the pixel values in the block are approximated to four different values for representation. An existing color limiting method, such as a median cut method, can be applied as the method of approximating the pixel values in the block to four different values for representation.

The code data of the intrablock quad approximate coding circuit 55 consists of four representative values of the block and pixel flags each indicating which of the four representative values the corresponding pixel is to be assigned to. Each of the four representative values is represented by eight bits. Each of the pixel flags consists of two bits to indicate which of the four representative values the corresponding pixel is to be assigned to. For an 8×8-pixel block, the data amount of the pixel flags becomes $$8 \times 8 \times 2 \text{ bits} = 128 \text{ bits}$$

The total data amount of the four representative values becomes $$8 \times 4 = 32 \text{ bits}$$

Therefore, the code data amount of the intrablock quad approximate coding circuit 55 becomes $$128 + 32 = 160 \text{ bits}$$

Thus, the coding ratio becomes $$160/(8 \times 8 \times 8) = 1/3.2$$

The intrablock quad approximate coding circuit 55 is applied to block images, each containing a large number of pixel values, requiring image quality of a comparatively high resolution, for example, block images containing both a natural image and a CG image, complicated CG areas, an edge area of CG containing a plurality of pixel values, etc.

Next, the intrablock binary approximate coding circuit 56 will be discussed. It adopts a coding technique for representing the whole block in two different values, an improvement of the block truncation coding technique. If the number of intrablock levels of a block is two or less, the two values become representative values of the block.

That is, if the number of intrablock levels is two or less, the decoded image in the block coded in the two values in the block completely matches the original image and the same effect as reversible coding is produced. If the number of intrablock levels is three or more, the pixel values in the block are approximated to two different values for representation. As with the intrablock quad approximate coding circuit 55, an existing color limiting method, such as a median cut method, can be applied as the method of approximating the pixel values in the block to two different values for representation.

The code data of the intrablock binary approximate coding circuit 56 consists of two representative values of the block and pixel flags each indicating which of the two representative values the corresponding pixel is to be assigned to. Each of the two representative values is represented by eight bits. Each of the pixel flags can be one bit to indicate which of the two representative values the corresponding pixel is to be assigned to. For an 8×8-pixel block, the data amount of the pixel flags becomes $$8 \times 8 \times 1 \text{ bits} = 64 \text{ bits}$$

The data amount of the representative values becomes $$8 + 8 = 16 \text{ bits}$$

Therefore, the code data amount of the intrablock binary approximate coding circuit 56 becomes $$64 + 16 = 80 \text{ bits}$$

Thus, the coding ratio becomes $$80/(8 \times 8 \times 8) = 1/6.4$$

The intrablock binary approximate coding circuit 56 is applied to areas, each containing pixel values of about two different values in the block, requiring image quality of a comparatively high resolution, for example, an area containing an edge of text/line drawing, etc., an area containing halftone dots such as dither, a CG gradation area, etc.

Last, the block run length coding circuit 57 will be discussed. It adopts an improvement of the block truncation coding technique. If adjacent block images are the same or are extremely similar to each other and the whole pixel values in the block are the same or almost the same, the whole block is represented by one value and the continuous blocks are represented by the number of the continuous blocks (run length).

After the above-described intrablock one-value approximation processing is performed for the block, the number of the same blocks which are continuous is counted and the number of the continuous blocks, namely, the run length is output as code. To perform approximation processing in one value in one block, an average of all pixel values in the block is found and is adopted as the representative value of the block. That is, if all pixel values in the block are the same, namely, the number of intrablock levels is one, the average value of the block indicates the pixel values in the block intact. Thus, if the block contains uniform pixel values, the decoded image in the block coded in block length completely matches the original image and the same effect as reversible coding is produced.

In the embodiment, the code data amount of the block run length coding circuit 57 contains eight-bit data indicating an average value in a block and eight-bit data indicating the run length (16 (=8+8) bits). Since the number of bits indicating the run length is eight, the maximum value of the run length is 256.

In the coding processing, if the run length is greater than 256, the block run length coding circuit 57 outputs code data with the run length 256 and outputs code of "the run length minus 256" as a new run length. In this case, the representative values are the same values. For example, if the run length is 500, code of the run length 256 and code of 244 (=500−256) are output. If the new run length resulting from the subtraction is greater than 256, again code of the run length 256 is output and substraction is repeated.

The coding ratio of the block run length coding circuit 57 varies depending on the run length value. The greater the run length, the higher the coding ratio; the smaller the run length, the lower the coding ratio. The minimum value of the run length is one. Since the original block size is eight X eight pixels, the coding ratio with the minimum value of the run length one is $$(8 \times 8)/(8 \times 8 \times 8 \times 1) = 1/32$$

Thus, the coding ratio of the block run length coding circuit 17 becomes 1/32 or more.

The coding mode of the block run length coding circuit 57 is applied to areas where uniform pixel values are continuous over a wide range, such as a background area of an image, not requiring representation of a comparatively high resolution.

The switch circuit 58 receives the four code data pieces output from the four coding circuits 54–57 and a tag signal output from the image characteristic determination circuit 53, selects one of the four code data pieces based on the result of the tag signal, and sends the selected code data to the multiplexing circuit 59.

The multiplexing circuit 59 receives the code data output from the switch circuit 58 and the tag signal output from the image characteristic determination circuit 53, embeds the tag signal in the top of the code data, and outputs them as one code data. The code data containing the tag signal output from the multiplexing circuit 59 is stored in a storage medium of a buffer memory, hard disk, etc., or is transmitted to an image decoding system through a transmission channel.

Figure 18:
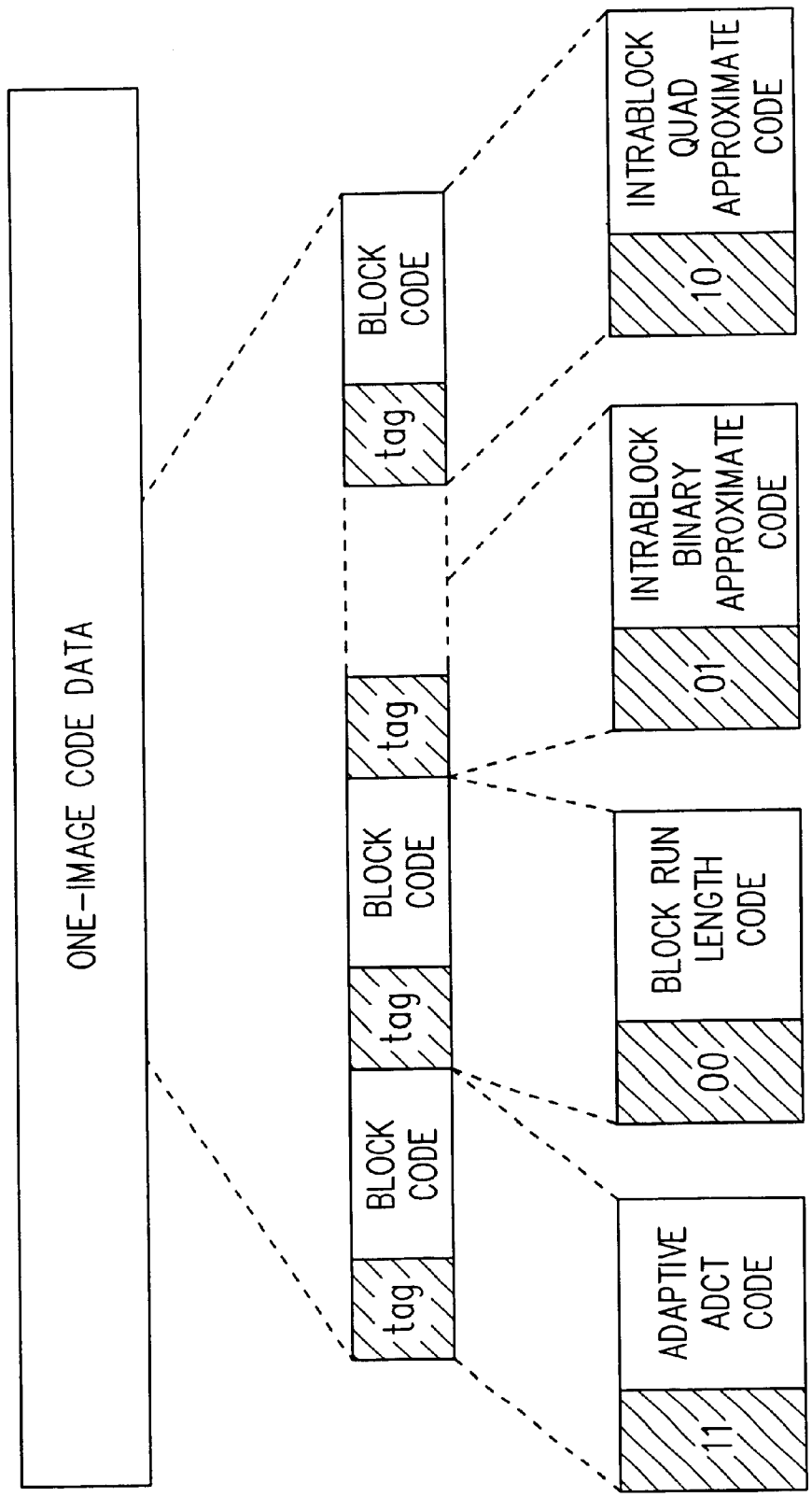
FIG. 18 shows a code data format according to the second embodiment of the invention.

FIG. 18 shows a code data format in the embodiment. As shown here, code data is output for each block. The two-bit tag signal indicating the code data type is embedded in the top of the code data in each block. FIG. 7 shows the code data formats in detail.

Figure 19:
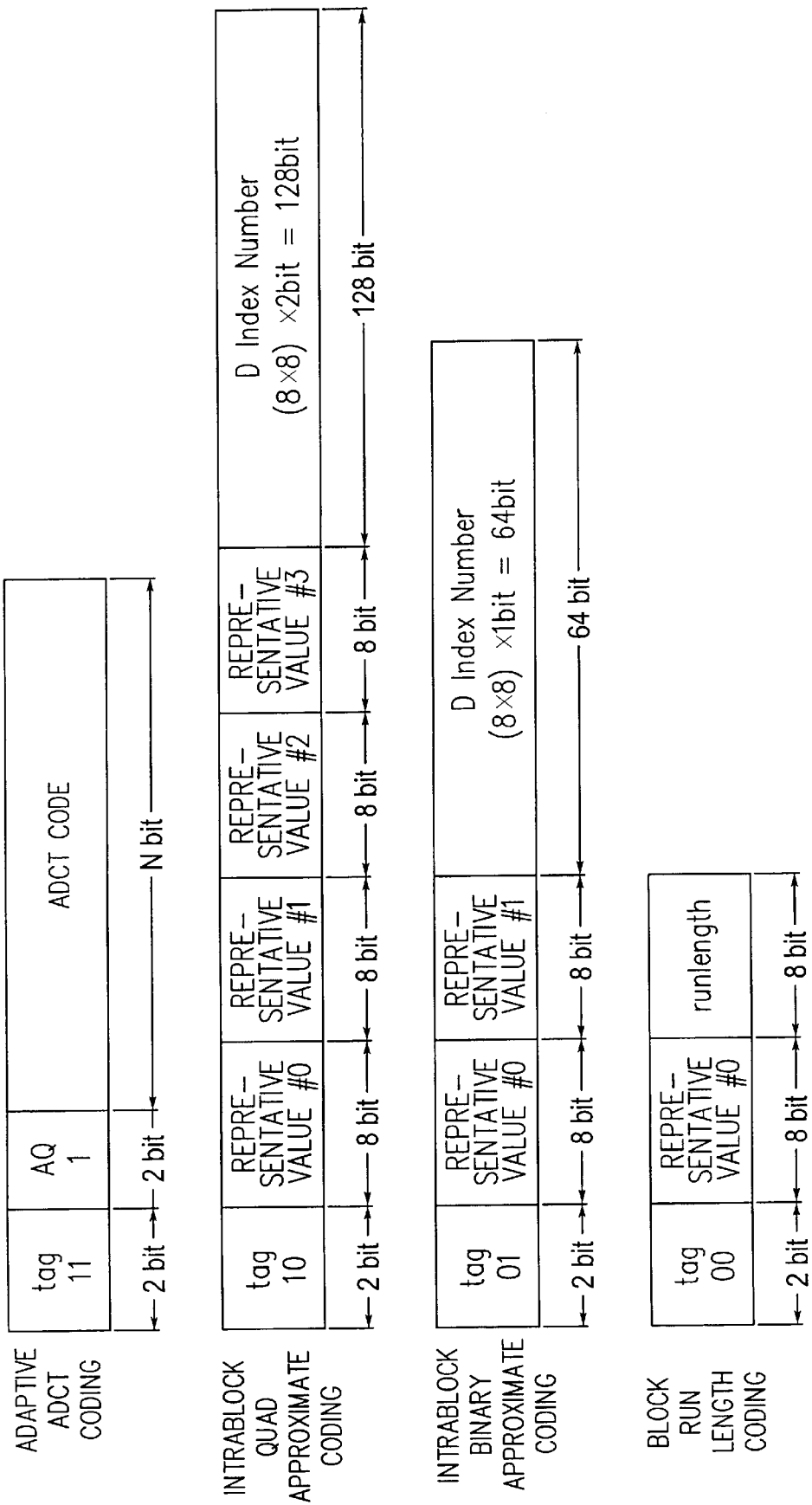
FIG. 19 shows the code data formats in more detail according to the second embodiment of the invention.

As seen in FIG. 19, the code format of adaptive ADCT coding begins with a two-bit tag indicating ADCT coding, followed by a tag indicating which quantization table is used, followed by ADCT code data. The code format of intrablock quad coding begins with a two-bit tag indicating the coding technique, followed by code data of intrablock quad coding. The code data begins with data of four block representative values, followed by 64 (8×8) two-bit index numbers (128-bit data) provided in a one-to-one correspondence with pixels, each indicating which representative value the corresponding pixel in the block is assigned to.

The code format of the intrablock binary coding technique begins with a two-bit tag indicating the coding technique, followed by two block representative values, followed by 64 one-bit index numbers (64-bit data) provided in a one-to-one correspondence with pixels, each indicating which representative value the corresponding pixel in the block is assigned to. The code format of the block run length coding technique begins with a two-bit tag indicating the coding technique, followed by one block representative value and data indicating the run length.

Figure 20:
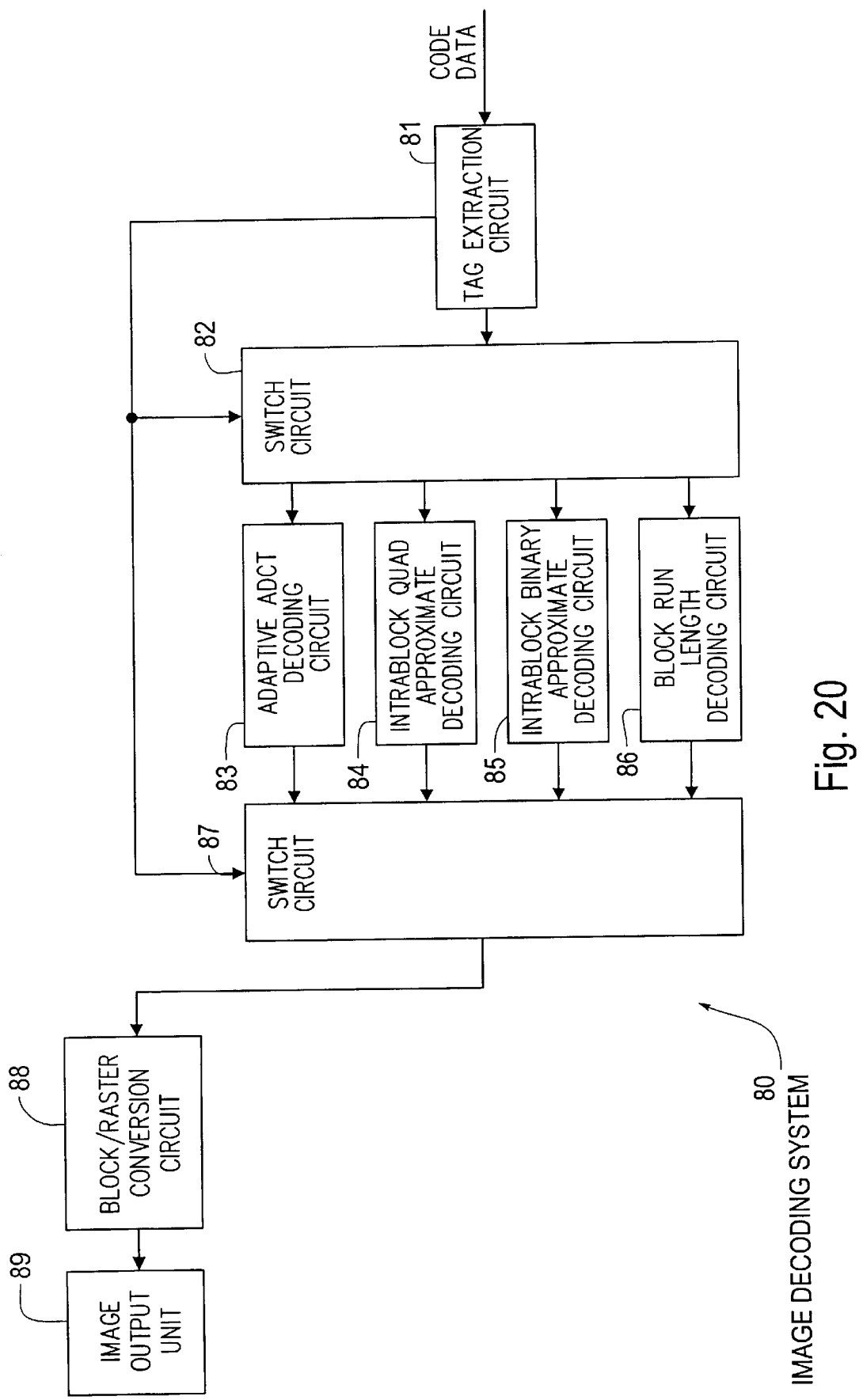
FIG. 20 is a block diagram to show a configuration example of an image decoding system according to the second embodiment of the invention.

FIG. 20 is a block diagram to show a configuration example of an image decoding system in the image processing system according to the second embodiment of the invention.

As seen in FIG. 20, an image decoding system 80 according to the second embodiment has a tag extraction circuit 81, a switch circuit 82, an adaptive ADCT decoding circuit 83, an intrablock quad approximate decoding circuit 84, an intrablock binary approximate decoding circuit 85, a block run length decoding circuit 86, a switch circuit 87, a block/raster conversion circuit 88, and an image output unit 89.

In the described image decoding system 80, the tag extraction circuit 81 inputs code data stored in a storage medium of a buffer memory, hard disk, etc., or transmitted through the transmission channel from the image coding system 50. As described above, the code data is formatted for each block and a two-bit tag signal indicating which coding technique the code data is coded in is entered in the top of the code data for each block. The tag extraction circuit 81 extracts the tag signal from the code data and separates the tag signal and the remaining code data, then outputs. The separated tag signal is supplied to the switch circuits 82 and 87.

The switch circuit 82 receives the tag signal and the code data from which the tag signal is extracted from the tag extraction circuit 81, selects one of the four decoding circuits, namely, the adaptive ADCT decoding circuit 83, the intrablock quad approximate decoding circuit 84, the intrablock binary approximate decoding circuit 85, and the block run length decoding circuit 86 based on the received tag signal, and outputs the received code data to the selected decoding circuit.

Upon reception of the code data, the adaptive ADCT decoding circuit 83, the intrablock quad approximate decoding circuit 84, the intrablock binary approximate decoding circuit 85, or the block run length decoding circuit 86 decodes the code data and reproduces a block image. The decoding circuits will be discussed specifically.

Figure 21:
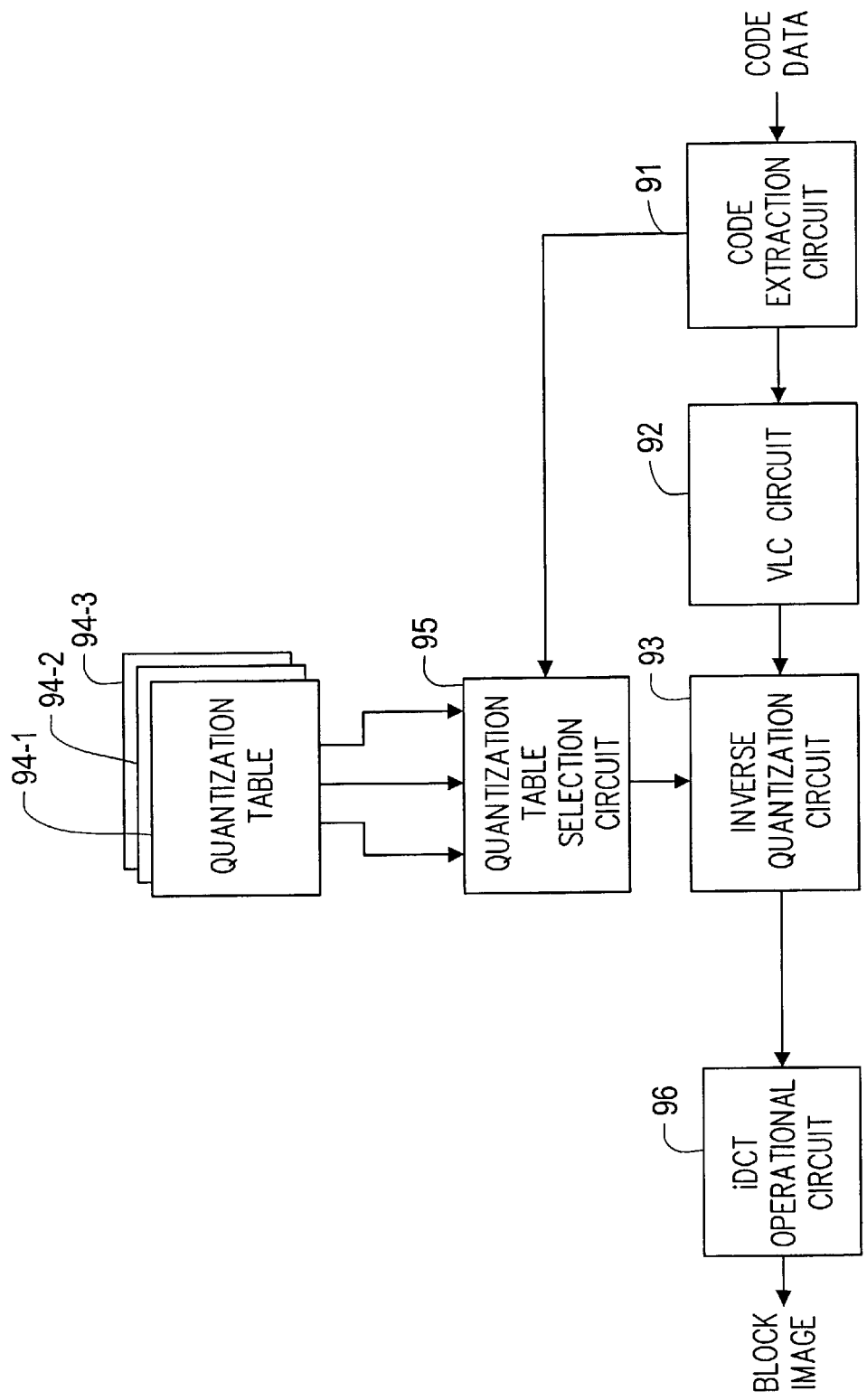
FIG. 21 is a block diagram to show a configuration example of an adaptive ADCT decoding circuit according to the second embodiment of the invention.

First, FIG. 21 is a block diagram to show a configuration example of the adaptive ADCT decoding circuit 83. As shown here, the adaptive ADCT decoding circuit 83 has a code extraction circuit 91, a VLD circuit 92, an inverse quantization circuit 93, quantization tables 94-1, 94-2, and 94-3, a quantization table selection circuit 95, and an iDCT operational circuit 96. In the adaptive ADCT decoding circuit 83, from input code data, the code extraction circuit 91 extracts a tag signal indicating the quantization table used for preparing the code data, then sends the extracted tag signal to the quantization table selection circuit 95 and the remaining code data after the extraction to the VLD circuit 92.

The VLD circuit 92 performs Huffman decoding processing and reconstitutes the code data to frequency data after quantization. The inverse quantization circuit 93 receives the frequency data after quantization output by the VLD circuit 92 and performs inverse quantization. The quantization table 94-1, 94-2, or 94-3 selected by the quantization table selection circuit 95 based on the tag signal extracted by the code extraction circuit 91 is used as the quantization table used for the inverse quantization. The iDCT operational circuit 96 executes iDTC of the frequency data supplied from the inverse quantization circuit 93 into a block image and outputs the block image.

The intrablock quad approximate decoding circuit 84 receives 160-bit code data and interprets the top 32 (=8×4) bits as four block representative values. Each of the block representative values consists of eight bits. The intrablock quad decoding circuit 34 disassembles the remaining 128-bit data into 64 parts each two bits in a one-to-one correspondence with 64 (=8×8) pixels making up one block as two-bit flags each indicting the representative value corresponding to the position of each pixel. It references the flag for each pixel, assigns the corresponding one of the four representative values to each pixel, and outputs one-block image data.

The intrablock binary approximate decoding circuit 85 receives 80-bit code data and interprets the top eight bits as the first block representative value and the next eight bits as the second block representative value. It disassembles the remaining 64-bit data into 64 parts each one bit in a one-to-one correspondence with 64 (=8×8) pixels making up one block as flags each indicting the representative value corresponding to the position of each pixel. The intrablock binary approximate decoding circuit 85 references the flag for each pixel. If the flag is "0," the intrablock binary approximate decoding circuit 85 assigns the first representative value to the pixel at the position; if the flag is "1," the intrablock binary approximate decoding circuit 85 assigns the second representative value to the pixel at the position. It repeats the work for one block and outputs one-block image data.

To decode the data coded in the block run length technique, the block run length decoding circuit 86 receives 16-bit data and interprets the top eight-bit data as the block representative value and the remaining eight-bit data as the run length. The decoding circuit 86 outputs whole filled-in 8×8-pixel blocks based on the representative value as many as the run length repeatedly.

The switch circuit 87 receives the tag signal sent from the tag extraction circuit 81, selects one of the four decoding circuits 83–86 based on the tag signal, receives image data from the selected decoding circuit, and sends the received block image data to the block/raster conversion circuit 88, which then converts the block image received from the switch circuit 87 into one original raster image data and sends the raster image data to the image output unit 89.

The image output unit 89 may be a unit for outputting image data onto paper, such as a printer or a plotter, a display unit for displaying an image, a unit for outputting a raster image directly to memory, or a unit for outputting image data to a network.

An example of coding processing responsive to input code data using the described image processing system according to the second embodiment will be discussed. To form the image coding system 50 actually as a part of a system, a storage medium such as memory or hard disk needs to be provided to retain code data. The memory capacity of the storage medium capable of retaining data is not infinite and is always limited as hardware. Thus, when a storage medium having one capacity is provided, code data needs to be contained in the capacity as the system.

As an example, assuming an image with eight-bit data for each pixel of A4 400 dpi as input image data, the operation and setting of the image processing system according to the embodiment with 5 M-byte memory set as a storage medium will be discussed. Since the input image data is A4 400 dpi eight bits/pixel, the whole image becomes a data amount of 16 Mbytes. Since the capacity of the memory for storing code data is 5 Mbytes, the input image data needs always to be coded to a code amount of 5 Mbytes or less. This means that the minimum coding ratio 1/3.2 (=5/16) needs to be realized 100%.

The coding ratios of the four coding circuits 54–57 are as follows: The coding ratio of the block run length coding is 1/32 or more; that of the intrablock binary approximate coding is 1/6.4; that of the intrablock quad approximate coding is 1/3.2; and that of the adaptive ADCT coding depends on setting of code cutoff. Thus, to realize the minimum coding ratio 1/3.2 for the whole image, the coding ratio of the adaptive ADCT coding needs always to be 1/3.2 or more. Thus, the code cutoff in the adaptive ADCT coding is set to 1/3.2.

Specifically, since the block image consists of eight X eight pixels, the number of bits of the block image becomes $$8 \times 8 \times 8 = 512 \text{ bits}$$

The target code amount of the code cutoff is set to the number of bits, which is 1/3.2 the number of bits 512

$$512/3.2 = 160 \text{ bits}$$

According to this setting, the coding ratio in the adaptive ADCT coding circuit 54 becomes 1/3.2 or more. Resultantly, whenever the image characteristic determination circuit 53 selects any coding circuit, the coding ratio becomes 1/3.2 or more and the coding ratio for the whole image also always becomes 1/3.2 or more. Thus, the minimum coding ratio for the whole image is guaranteed 100%.

Further, an example in which the memory capacity of a storage medium is set to 2.5 Mbytes will be discussed. In the example, the minimum coding ratio for the whole image becomes 1/6.4 (=2.5/16). In this case, the minimum coding ratio is higher than the coding ratio of the intrablock quad approximate coding technique, 1/3.2, thus the intrablock quad approximate coding circuit 55 is not selected. At the same time, the target code amount of the code cutoff in the adaptive ADCT coding is set to 80 (=512/6.4). If the image characteristic determination circuit 53 selects the intrablock quad approximate coding circuit 55, the adaptive ADCT coding is applied instead, whereby the minimum coding ratio for the whole image is guaranteed 100%.

As described above, in the image processing system according to the embodiment, the image coding system 50 receives raster-expanded image data, performs image coding processing for the data, and outputs code data. On the other hand, the image decoding system 80 receives the code data, performs image decoding processing for the data, and outputs raster image data. At this time, if the image contains mixed image areas greatly different in image characteristic, such as CG image and natural image areas, efficient coding is executed, and if a small code data memory capacity is available, a high-quality decoded image can be provided. Since advanced processing is included, the processing scale becomes larger than that of the first embodiment, but a higher-quality decoded image can be provided.

As described above, according to the invention, an input image is divided into blocks, an image characteristic is determined for each block, and variable-length irreversible coding and fixed-length irreversible coding are changed adaptively based on the determination result. Thus, if the image contains mixed areas greatly different in image characteristic, such as CG image and natural image areas, efficient coding and efficient decoding are executed, and if a small code data memory capacity is available, a high-quality image can be provided with minimized image quality degradation of the decompressed image.

What is claimed is:

1. An image coding system comprising:

block division means for dividing an input image into blocks each containing a plurality of pixels;

image characteristic determination means for determining a characteristic of an image in each of the blocks divided by said block division means;

variable-length coding means for performing variable-length coding for the input image;

fixed-length coding means for performing fixed-length coding for the input image; and control means for selecting either of said variable-length coding means and said fixed-length coding means based on the determination result of said image characteristic determination means and controlling said selected coding means to execute coding for the input image.

2. The image coding system as claimed in claim 1, further comprising:

multiplexing means for adding to code data coded by said variable-length coding means or said fixed-length coding means, identification information of said variable-length coding means or said fixed-length coding means performing the coding and outputting the code data to which the identification information being added.

3. The image coding system as claimed in claim 1, wherein if said image characteristic determination means determines that the image in the block is a natural drawing, said control means selects said variable-length coding means, and wherein if said image characteristic determination means determines that the image in the block is a line drawing, said control means selects said fixed-length coding means.

4. The image coding system as claimed in claim 1, wherein said control means comprises comparison means for comparing a data amount of the code data coded by said variable-length coding means with a predetermined threshold value, and wherein if said comparison means determines that the data amount of the code data is smaller than the threshold value, said variable-length coding means is selected, and if said comparison means determines that the data amount of the code data is greater than the threshold value, said fixed-length coding means is selected.

5. The image coding system as claimed in claim 4, wherein the predetermined threshold value is a maximum code amount for each block set from a preset target minimum coding ratio of an image.

6. The image coding system as claimed in claim 1, wherein said variable-length coding means and said fixed-length coding means perform irreversible coding for the input image.

7. The image coding system as claimed in claim 6, wherein said variable-length coding means performs orthogonal transformation coding.

8. The image coding system as claimed in claim 6, wherein the fixed-length irreversible coding performed by said fixed-length coding means is block truncation coding.

9. The image coding system as claimed in claim 8, wherein said fixed-length coding means comprises a plurality of block truncation coding means.

10. The image coding system as claimed in claim 9, wherein said control means selects one of the block truncation coding means based on the determination result of said image characteristic determination means.

11. The image coding system as claimed in claim 1, wherein an image in each block determined by said image characteristic determination means has the characteristic of containing at least the number of different pixel values of the image in the block.

12. The image coding system as claimed in claim 11, wherein if it is determined that the number of different pixel values determined by said image characteristic determination means is equal to or less than a predetermined threshold value, said control means selects said fixed-length coding means.

13. The image coding system as claimed in claim 11, wherein said control means selects one of said block truncation coding means based on the number of different pixel values determined by said image characteristic determination means.

14. The image coding system as claimed in claim 13, wherein said control means selects block truncation coding means having as many representative values as the number of different pixel values determined by said image characteristic determination means from among said block truncation coding means.

15. The image coding system as claimed in claim 1, wherein an image in each block determined by said image characteristic determination means has the characteristic of containing at least an occurrence frequency distribution of pixel values of the image in the block.

16. The image coding system as claimed in claim 15, wherein if said image characteristic determination means determines that pixels of a predetermined value or more are distributed in the proximity of an end of the occurrence frequency distribution of the pixel values of the image in the block, said control means selects said fixed-length coding means.

17. An image decoding system for decoding code data coded using variable-length coding or fixed-length coding for an input image divided into blocks based on the determination result of determining an image characteristic for each block, the code data to which identification information indicating the used coding type is added, said image decoding system comprising:

extraction means for extracting the identification information from the code data;

variable-length decoding means for performing variable-length decoding of the code data from which the identification information is extracted;

fixed-length decoding means for performing fixed-length decoding of the code data from which the identification information is extracted; and control means for selecting either of said variable-length decoding means and said fixed-length decoding means based on the identification information extracted by said extraction means and controlling said selected decoding means to execute decoding for the code data from which the identification information is extracted.

18. An image processing system comprising:

an image coding system for dividing an input image into blocks each containing a plurality of pixels, determining an image characteristic for each block, executing coding for the input image using variable-length coding or fixed-length coding based on the determination result, and outputting code data to which identification information indicating the used coding type is added; and an image decoding system for extracting the identification information from the code data output from said image coding system, decoding the code data from which the identification information is extracted using variable-length decoding or fixed-length decoding corresponding to the extracted identification information, and outputting the decoded data.

19. An image coding method comprising the steps of:

dividing an input image into blocks each containing a plurality of pixels;

determining a characteristic of an image in each block;

selecting either of variable-length coding and fixed-length coding based on the determination result; and executing the selected coding for the input image.

20. The image coding method as claimed in claim 19, wherein identification information indicating the used coding type of variable-length coding or fixed-length coding is added to the code data coded using either of the variable-length coding and the fixed-length coding and the code data to which the identification information is added is output.

21. An image decoding method for decoding code data coded using variable-length coding or fixed-length coding for an input image divided into blocks based on the determination result of determining an image characteristic for each block, the code data to which identification information indicating the used coding type is added, said image decoding method comprising the steps of:
extracting the identification information from the code data;
selecting either of the variable-length decoding and the fixed-length decoding based on the extracted identification information; and
executing decoding for the code data from which the identification information is extracted.

22. An image processing method comprising the steps of:
dividing an input image into blocks each containing a plurality of pixels;
determining a characteristic of an image in each block;
selecting either of variable-length coding and fixed-length coding based on the determination result;
executing the selected coding for the input image;
adding identification information indicating the selected coding type of variable-length coding or fixed-length coding;
outputting the code data to which the identification information is added;
extracting the identification information from the code data;
selecting either of the variable-length decoding and the fixed-length decoding based on the extracted identification information; and
executing decoding for the code data from which the identification information is extracted.

23. A printing system comprising:
block division means for dividing an input image into blocks each containing a plurality of pixels;
image characteristic determination means for determining a characteristic of an image in each of the blocks provided by said block division means;
variable-length coding means for performing variable-length coding for the input image;
fixed-length coding means for performing fixed-length coding for the input image;
control means for selecting either of said variable-length coding means and said fixed-length coding means based on the determination result of said image characteristic determination means and controlling said selected coding means to execute coding for the input image; and
storing memory for storing less than the fixed-length coding.

* * * * *